United States Patent [19]

Neff

[11] Patent Number: 5,487,001

[45] Date of Patent: Jan. 23, 1996

[54] METHOD FOR DETERMINING PETROPHYSICAL PROPERTIES OF A SUBTERRANEAN LAYER

[76] Inventor: Dennis B. Neff, 2225 Bridget Ct., Bartlesville, Okla. 74006

[21] Appl. No.: 69,247

[22] Filed: May 28, 1993

[51] Int. Cl.$^6$ ............................................ G01V 1/00
[52] U.S. Cl. ................................ 364/421; 367/47
[58] Field of Search ........................ 364/420, 422, 364/421; 367/46, 47, 45

[56] References Cited

U.S. PATENT DOCUMENTS

| | | | |
|---|---|---|---|
| 4,210,968 | 9/1980 | Lindseth | 367/46 |
| 4,635,239 | 1/1987 | Neff | 364/47 |
| 4,661,935 | 4/1987 | Shock et al. | 367/70 |
| 4,679,174 | 7/1987 | Gelfand | 367/73 |
| 4,858,202 | 8/1989 | Fitch et al. | 367/75 |
| 4,885,711 | 12/1989 | Neff | 364/574 |

OTHER PUBLICATIONS

Neff, Dennis B. "Incremental Pay Thickness Modeling of Hydrocarbon Reservoirs." *Geophysics*, vol. 55, No. 5 (May 1990), pp. 556–566.

Neff, Dennis B. "Estimated Pay Mapping Using Three-dimensional Seismic Data and Incremental Pay Thickness Modeling." *Geophysics*, vol. 55, No. 5 (May 1990), pp. 567–575.

Hardage, Bob A ed. *Seismic Stratigraphy*, London–Amsterdam, 1987, pp. 74–76, 238–268.

*Primary Examiner*—Gail O. Hayes
*Assistant Examiner*—Andrew Bodendorf

[57] ABSTRACT

A method is provided for determining petrophysical properties associated with various lateral locations of a subterranean layer. The method employs velocity and density log data, corresponding to a preselected reference lateral location, in combination with seismic data to determine a range of values of at least one petrophysical property associated with a desired lateral location ("nonreference") offset from the reference lateral location.

10 Claims, 2 Drawing Sheets

METHOD FOR DETERMINING PETROPHYSICAL PROPERTIES OF A SUBTERRANEAN LAYER

BACKGROUND OF THE INVENTION

This invention relates to a method for determining petrophysical properties of a subterranean layer which employs both seismic data and log data.

It is well known to employ logs, such as wireline well logs, to determine valuable petrophysical properties associated with a subterranean layer of interest. Petrophysical properties, such as porosity, water or hydrocarbon saturation, and lithological composition (i.e. shale or sand), provide valuable information in determining the presence and extent of hydrocarbons in the layer of interest. However, such logs are very limited in a real extent to only about 6–12 inches around a borehole in which measure meets are taken. Moreover, obtaining logs such as wireline well logs can be time consuming and expensive in requiring drilling of a borehole for each such well log.

Petrophysical properties of a layer of interest can vary widely at different locations. Therefore, accurate determination of variations in properties over a large area of a layer are not practical by use of wireline well logs, since such determination would require many, possibly hundreds or thousands, of such well logs.

Seismic prospecting is effective in estimating depths to subterranean layers, and is cost effective in surveying a large area, but the resulting seismic data provides insufficient information to make accurate determinations of, for example, the extent and amount of hydrocarbons in a hydrocarbon-containing subterranean layer (hydrocarbon reservoir).

SUMMARY OF THE INVENTION

It is, therefore, an object of the invention to provide a cost effective method capable of determining petrophysical properties associated with a subterranean layer of interest at any lateral location thereof.

The above object is realized by a method described herein as a series of ten steps employing both seismic and log data. The method permits accurate determination of petrophysical properties of a layer of interest at any desired lateral location thereof. The method is cost effective insofar as it requires minimal log data (as little as a single set of data corresponding to a single lateral location) to be employed with the seismic data.

DETAILED DESCRIPTION OF THE DRAWINGS

Figure 3:
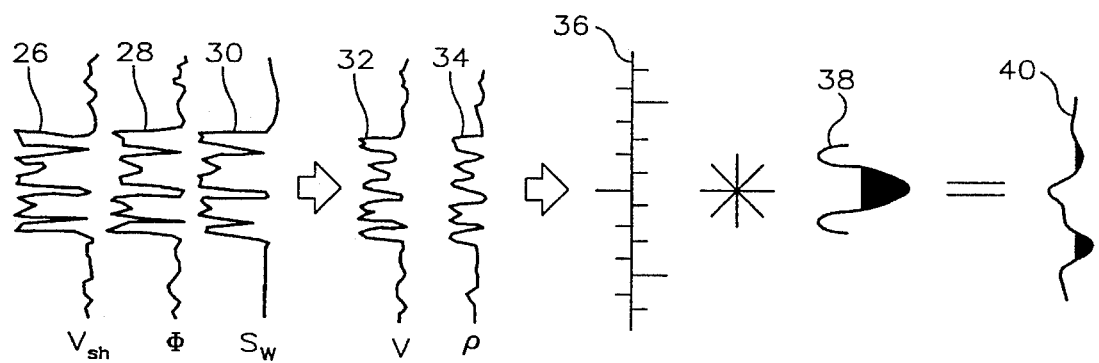

FIG. 3 schematically illustrates the manner in which a plurality of logs, corresponding to a particular lateral location of the layer of interest, are employed in production of a synthetic seismogram.

Figure 1:
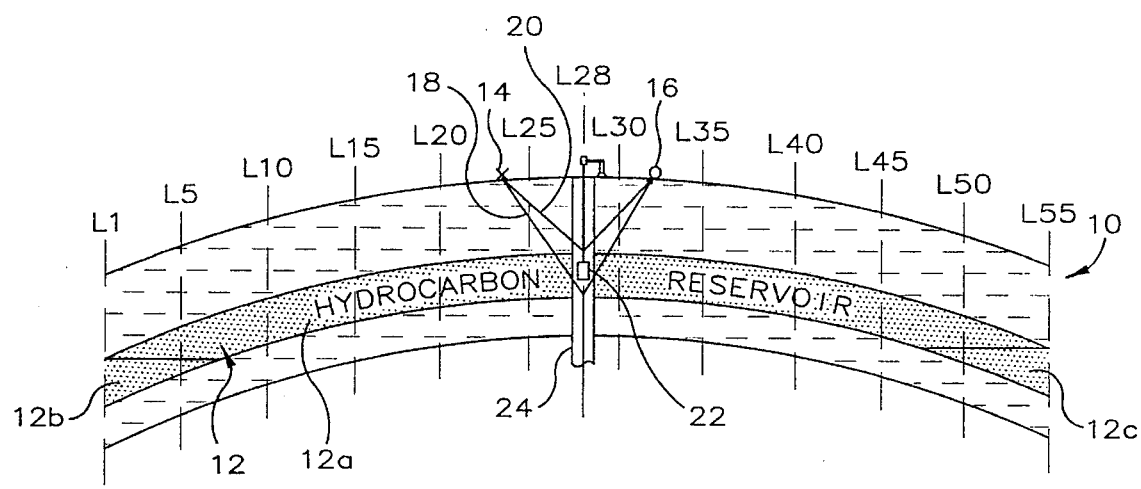
FIG. 1 is a schematic illustration of a cross-section of the earth which shows a subterranean layer of interest having a hydrocarbon reservoir extending therethrough. This Figure also schematically illustrates seismic and well log equipment for collecting data employed in the method of the invention.
Figure 4A:
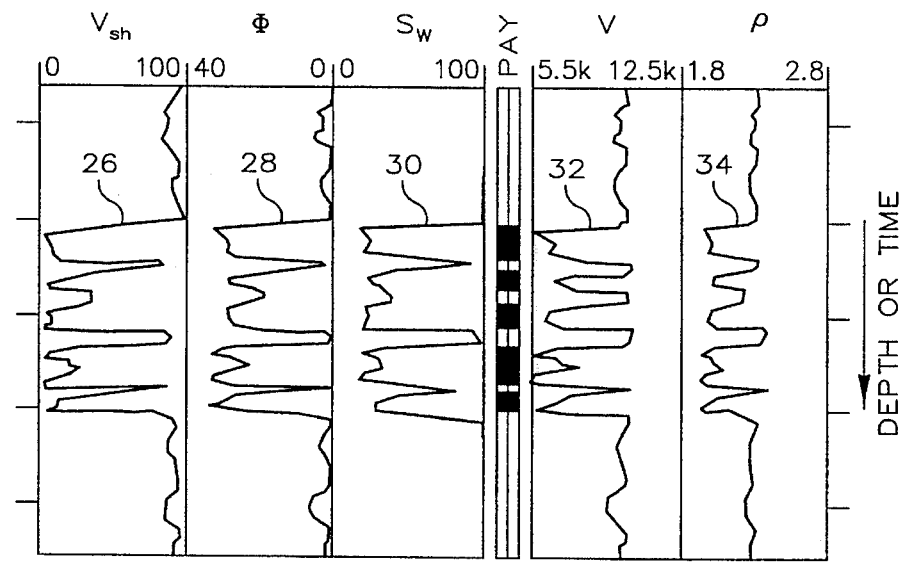
Figure 4B:
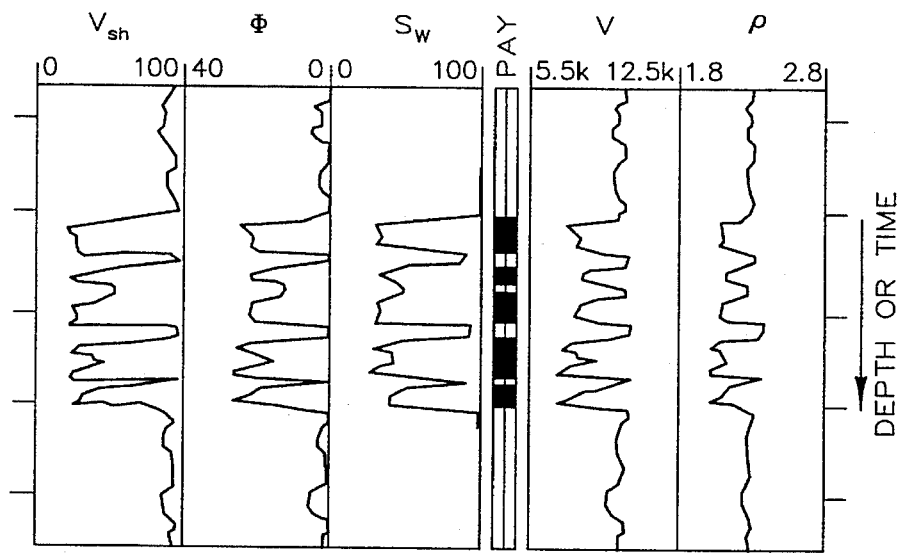
Figure 4C:
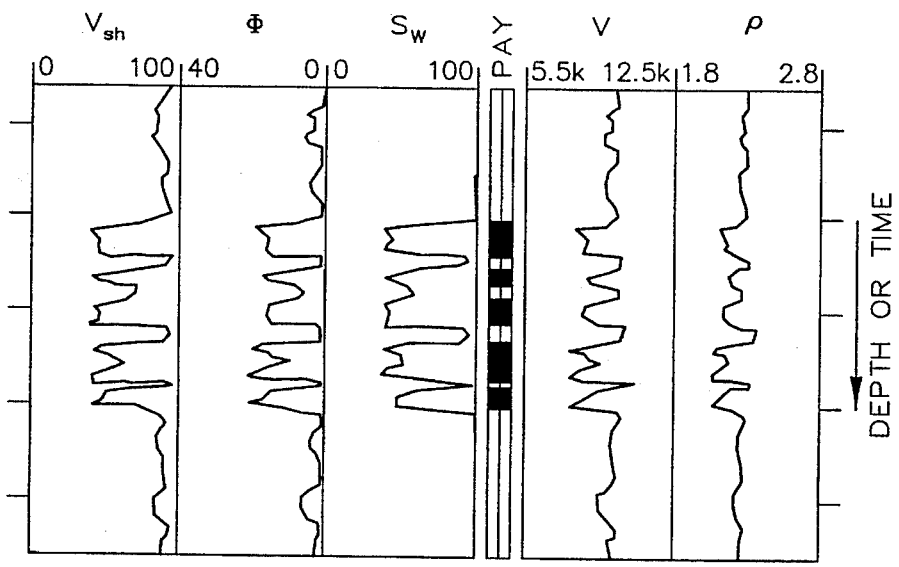

FIG. 4A shows logs which correspond to a reference lateral location in FIG. 1, and FIGS. 4B and 4C show modified versions of the logs in FIG. 4A which are employed in the method of the invention.

DETAILED DESCRIPTION OF THE INVENTION

The method of the invention will now be described in detail in terms of a simple embodiment employing a single reference lateral location and a single reference log-pair. It should be understood, however, that the method could employ multiple reference lateral locations and associated reference log-pairs, as is employed in a subsequent example described herein. The number of reference lateral locations and reference log-pairs employed depends upon the size of the area for which petrophysical properties are desired, and the extent to which the geology of such area varies.

Various terms as used herein and in the appended claims are defined as follows.

A "lateral location", as such term is used herein, is defined by a vertical line wherein different lateral locations are horizontally spaced from one another.

The term "log" refers to a set of at least one data point or series of data points, expressible in terms of a curve or function of depth or time, representative of a particular physical parameter associated with a subterranean formation and obtained by any means, unless a particular means is specified.

The term "petrophysical property" means any property of a subterranean layer which is related to the presence (or lack thereof) and/or amount of hydrocarbons in such layer. Examples of petrophysical properties include, but are not limited to, layer thickness, porosity, lithological composition (i.e. volume percent of shale or sand), water or hydrocarbon saturation, and any properties derived from one or more of the aforementioned properties such as gross pay thickness, net pay thickness, net pore thickness, hydrocarbon pore volume, and net porosity. The latter-mentioned five properties are discussed and defined below with reference to the Figures.

The term "pay" as used in some of the above terms is a shorthand term for hydrocarbon-bearing or containing in what is deemed to be sufficient quantities at a given depth to justify commercial production.

The term "reflection coefficient" is a parameter which is calculated from velocity and density as is further discussed below, and such term as used by itself refers to a set of at least one value or a set of a series of values which can be expressed in terms of a curve or function of time or depth. In the latter case of a set of a series of values, the term "reflection coefficient series" will sometimes be used.

The term "crosscorrelation" is well known to those skilled in the art, and refers to a technique of measuring the similarity of two waveforms. When normalized, a crosscorrelation value of one indicates a perfect match and a value near zero indicates little correlation.

The term "difference mismatch error" as such term is applied to the comparison of a first waveform and a second waveform, where each waveform has corresponding data points at predetermined sample intervals, is the sum of the absolute values of the differences in amplitudes between corresponding data points of the first and second waveforms divided by the number of samples within a designated comparison window.

The various steps of the method, which can be performed in a different order if desired, will now be described with respect to determination of petrophysical properties of a hydrocarbon reservoir schematically illustrated in FIG. 1. There is shown in FIG. 1 a cross-section of the earth at 10 having multiple subterranean layers. One of such layers shown at 12 has a primarily hydrocarbon-bearing section 12a, designated as the hydrocarbon reservoir, and primarily water wet sections 12b and 12c. The lateral extent of reservoir 12a ranges from a first lateral location at L1 to a fifty-fifth lateral location at L55. Every fifth lateral location is shown, with the exception of the twenty-eighth lateral location at L28, which is the reference lateral location sometimes denoted hereafter as "reference L28" or simply the "reference lateral location". The other lateral locations are nonreference lateral locations sometimes denoted hereafter by the phrase constituted by "nonreference" followed by a particular location number or by simply "nonreference lateral location(s)".

1. Provide Reference Seismic Trace and Nonreference Seismic Traces

Figure 2:
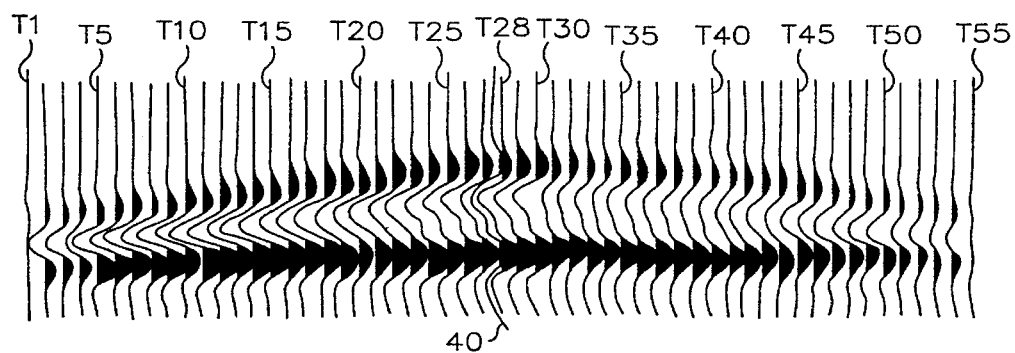
FIG. 2 is a depiction of a portion of a seismic section, where such seismic section is composed of a plurality of seismic traces respectively corresponding to various lateral locations of the layer of interest in FIG. 1.

The reference seismic trace, designated as T28 in FIG. 2 and sometimes referred to hereafter as "reference T28" or simply the "reference seismic trace", corresponds to the reference lateral location, reference L28. The reference seismic trace, reference T28, can be conventionally obtained by generation of at least one seismic pulse at the surface, which travels down to the boundaries of reservoir layer 12 so as to be reflected by such boundaries and received/detected by one or more receivers. Such a surface seismic arrangement is schematically illustrated in FIG. 1. A seismic source is indicated at 14 and a seismic receiver at 16. The midpoint between such a source and receiver is at reference L28 such that rays associated with the seismic pulse, indicated at 18 and 20, are reflected by the upper and lower boundaries of layer 12 at reference L28 and accordingly received and detected by receiver 16 to produce reference T28. Reference T28 includes the two reflection events corresponding to the respective upper and lower boundaries of layer 12.

Of course, in actual practice, a plurality of source-receiver pairs, having a common midpoint at reference L28, would be employed to obtain a plurality of seismic traces, which would then be corrected for normal moveout and stacked to obtain a single composite trace such as reference T28 shown in FIG. 2.

Similarly, each of the nonreference seismic traces, nonreference T1–T27 and T29–T55, are obtained by employing source-receiver pairs not shown. Nonreference T1–T27 and T29–T55 respectively correspond to reference L1–L27 and L29–L55, and each include a pair of reflection events respectively corresponding to the upper and lower boundaries of layer 12.

2. Provide Reference Log-Pair

A reference log-pair, comprising a velocity log and a density log, is provided for layer 12 at reference L28. Such reference log-pair should also have associated therewith at least one known petrophysical property which is desired to be determined for the various nonreference lateral locations. Velocity can be expressed for the velocity log in, for example, feet/second or in the reciprocal form of microseconds/foot (called a "sonic log").

The reference log-pair can, according to certain broad aspects of the invention, be obtained by any means including, but not limited to, wireline well logs, other types of well logs such as those obtained from surface analyses of core samples or cuttings, vertical seismic profiles, and any combinations or derivations thereof. It is preferred, however, to obtain the reference log-pair in the manner described below, employing wire line well logs and derivations of such logs. In FIG. 1, a well logging tool is schematically indicated at 22 as being suspended in a borehole 24 by a suitable wireline so as to be positioned at reference L28 between the upper and lower boundaries of layer 12. An appropriate type of tool, depending on the parameter being measured, is employed to make measurements through layer 12 at various depths at predetermined increments. Such increments can range from a few inches to several feet, but are typically about ½ foot.

According to a preferred embodiment, velocity (represented by "v", i.e. ft/sec) and density (represented by "$\rho$", i.e. g/cm$^3$) wireline well logs are taken for layer 12 between the upper and lower boundaries of such layer. Such wireline well logs are employed in combination with other appropriate wireline well logs, such as gamma, spontaneous potential, and resistivity well logs, to derive a porosity (represented by "$\Phi$", the fraction i.e. in %, of the total volume of formation material which is pore volume) log in a manner well known to those skilled in the art. A saturation (i.e. "$S_w$", the fraction, i.e. in %, of the pore volume of the formation material which is occupied by water) log is similarly derived from resistivity or induction wireline well logs and a lithological composition log (i.e. "$V_{sh}$", the fraction i.e. in %, of the total volume of formation material which is shale) is derived from a gamma or spontaneous potential wireline well log. Such $V_{sh}$, $\Phi$, and $S_w$ logs are shown at 26, 28, and 30, respectively, in FIG. 3. Each of $V_{sh}$, $\Phi$, and $S_w$ are petrophysical properties associated with the reference lateral location, reference L28, from which other very useful petrophysical properties can be derived as will be explained in another step.

New velocity (v) and density ($\rho$) logs, such as those shown in FIG. 3 at 32 and 34 respectively, are derived from the $V_{sh}$, $\Phi$, and $S_w$ logs in a manner described in detail in a subsequent example, thereby providing the desired reference log-pair.

3. Determine Reference Reflection Coefficient

From the velocity and density logs 32 and 34 of the reference log-pair, the reference reflection coefficient is preferably determined as a series of values, schematically indicated at 36 in FIG. 3, from the well known formula $$\frac{\rho_2 v_2 - \rho_1 v_1}{\rho_2 v_2 + \rho_1 v_1},$$

wherein a reflection coefficient value is calculated from such formula for each corresponding data point-pair at predetermined sample intervals. A data point-pair from velocity log 32 would comprise $v_2$ and $v_1$ corresponding to data points separated by the predetermined sample interval, and a corresponding data point-pair from density log 34 would comprise $\rho_2$ and $\rho_1$ corresponding to data points separated by the predetermined sample interval.

4. Provide Seismic Wavelet

At least one seismic wavelet is provided which is representative of the seismic pulse(s) at the layer of interest, layer 12, and which when convolved with the reference reflection coefficient series determined in step 3 produces a reference synthetic seismogram which approximates the reference seismic trace, reference T28.

A seismic wavelet can be derived by various techniques. For example, the actual seismic pulse(s) can be measured at the surface and then corrected by appropriate data processing to account for distorting effects of the earth between the surface and layer 12. Or, more preferably, the wavelet is extracted from a line of seismic traces (i.e. seismic section portion) corresponding to lateral locations closely adjacent to reference L28, such as T1–T55.

The seismic wavelet produced as discussed above is convolved with the reference reflection coefficient to produce a reference synthetic seismogram. If comparison (over corresponding comparison windows including reflection events corresponding to the upper and lower boundaries of layer 12) of the thus produced reference synthetic seismogram with the reference seismic trace, T28, by any suitable comparison technique (such as crosscorrelation), passes at least one predetermined matching threshold (i.e. a minimum crosscorrelation value of, for example, 0.90 or 0.95), such seismic wavelet can be employed in subsequent step (7). Such comparison will necessitate approximate alignment of the reference seismic trace with the reference synthetic seismogram, and may also preferably involve shifting of either with respect to the other to determine the alignment which gives the best match. If such comparison does not pass the predetermined matching threshold, the seismic wavelet can be modified in shape by modifying wavelet frequency, amplitude, and/or phase until such matching threshold is passed. Alternatively, a predetermined number of wavelets can be generated having slightly different shapes, and the wavelet selected for use in step (7) which, when convolved with the reference reflection coefficient series, produces the reference synthetic seismogram which passes a predetermined matching threshold, where such threshold is passed by such reference synthetic seismogram as providing the best match (i.e. highest crosscorrelation value) to the reference seismic trace, T28.

Referring again to FIG. 3, the seismic wavelet as derived above is indicated at 38, the convolution operation is represented by "*", and the resulting reference synthetic seismogram is shown at 40. Reference synthetic seismogram 40 is also shown in FIG. 2 as being superimposed over reference T28.

The following portions of the text entitled *Seismic Stratigraphy*, vol. 9, edited by Bob Hardage, Geophysical Press, London-Amsterdam, 1987, are referenced, and hereby incorporated by such reference, with respect to background information well known to those skilled in the art: seismic wavelet derivation techniques, pp. 257–268; production of synthetic seismograms, pp. 74–76; and wavelet shaping and processing, pp. 238–257.

5. Deriving Set of Modified Log-Pairs

A set of a predetermined number of modified log-pairs are derived in accordance with this step. Each modified log-pair is different from one another and comprises a velocity log and a density log, each of which logs is a modified version of the respective velocity log and density log of the reference log-pair. Each of the modified log-pairs corresponds to a petrophysical property or properties also associated with the reference log-pair, but the value(s) of such property or properties are different than the known value(s) associated with the reference log-pairs. The modified log-pairs should preferably be representative of probable and reasonable variations of the petrophysical property or properties for the various nonreference lateral locations of layer 12.

According to a preferred embodiment and with reference to FIGS. 4A–4C, examples of possible logs in accordance with the invention are shown as being a function of depth or time (i.e. two-way travel time obtained by conventional depth to time conversion), where such depth or time increases in the direction of the illustrated arrows and where $V_{sh}$, $\Phi$, $S_w$, v, and $\rho$ are scaled according to typical values. $V_{sh}$, $\Phi$, and $S_w$ are in percent, v is in feet/second, and $\rho$ is in g/cm$^3$.

FIG. 4A illustrates $V_{sh}$, $\Phi$, and $S_w$ logs 26, 28, and 30, respectively, which are representative of petrophysical properties associated with the reference log-pair comprising velocity log 32 and density log 34. Other useful petrophysical properties, also being associated with the reference log-pair, can be derived from $V_{sh}$ log 26, $\Phi$ log 28, and $S_w$ log 30 and are described below.

Pay (as previously defined) intervals, indicated in black in FIG. 4A, are those intervals of depth or time for which $V_{sh}$ log 26, $\Phi$ log 28, and $S_w$ log 30 exceed predetermined minimum "pay threshold" values. In terms of the depth dimension, several petrophysical properties can be defined as follows. The "gross pay thickness" is defined as the total thickness between the upper and lower limits of pay, which is less than or equal to the thickness of layer 12 at the reference lateral location, L28. The "net pay thickness" is the combined thickness of only the pay intervals. The "net pore thickness" is the sum of a series of $\Phi \times \Delta D$ products, where each such product corresponds to a different depth increment $\Delta D$ within a pay interval and between the upper and lower limits of pay, $\Phi$ is the porosity associated with depth increment $\Delta D$, and where there are a predetermined number of depth increments between the upper and lower limits of pay which is generally equivalent to the depth increments at which log data was collected in step 2. The "hydrocarbon pore volume" is the sum of a series of $\Phi \times (100\% - S_w) \times \Delta D$ products, where $\Phi$ and $\Delta D$ are as defined with respect to net pore thickness and where $S_w$ is the water saturation (in percent) associated with $\Delta D$. The "net porosity" is the sum of a series of $\Phi$ values corresponding to respective depth increments $\Delta D$, divided by the number of depth increments $\Delta D$, where $\Phi$ and $\Delta D$ are as defined with respect to net pore thickness. In other words, net porosity is the average porosity in the pay intervals between the upper and lower limits of pay, and is equivalent to net pore thickness/net pay thickness.

FIGS. 4B and 4C illustrate examples of two modified log-pairs, each comprising a velocity log and density log, and also examples of $V_{sh}$, $\Phi$, and $S_w$ logs from which the modified log-pairs were derived in the manner discussed previously. It can be seen that the $V_{sh}$, $\Phi$, and $S_w$ logs in FIGS. 4B and 4C have been modified with respect to amplitude as compared to the corresponding logs in FIG. 4A. Rather than modifying $V_{sh}$, $\Phi$, and $S_w$ concurrently as in FIGS. 4B and 4C only one or a combination of only two of such properties could be modified in the derivation of the corresponding modified log-pairs. It should be apparent that layer thickness could also be modified.

Each of the modified log-pairs resulting from this step have associated therewith the petrophysical property value(s) which were subject to modification in deriving the modified log-pairs. Such value(s) preferably correspond to a petrophysical property or properties which have a single recordable or storable value to be associated with any one modified log-pair, such as the pay thickness, net pore thickness, hydrocarbon pore volume, and/or net porosity which are derivable (as discussed above) from $V_{sh}$, $\Phi$, and/or $S_w$ logs. Or, such desired single values as associated with corresponding modified log-pairs could be average or mean $V_{sh}$, $\Phi$, and/or $S_w$ values derivable from the corresponding logs.

The number of modified log-pairs provided in this step can vary widely, depending upon the known variability of the geology of the area being investigated and the area extent of the layer of interest for which petrophysical property values are desired (i.e. area defined by the nonreference lateral locations). Typically, about 10 to about 200 modified log-pairs are derived according to the illustrated embodiment employing a single reference lateral location.

As stated above, the modified log-pairs resulting from this step are preferably representative of probable variations of the petrophysical property value(s) over the area extent of the layer of interest for which petrophysical property values are desired (i.e. area defined by the nonreference lateral locations). The extent to which modifications discussed above are permitted is a somewhat subjective judgement by the geoscientist having knowledge of the geology of the area, so that constraints (minimums and/or maximums) upon modification actually made by a suitable computer program can be provided by the geoscientist as inputs to such program.

6. Determine Modified Reflection Coefficients

The velocity log and density log of each modified log-pair are employed to determine a corresponding modified reflection coefficient series (in the same manner as described in step 3 with respect to the reference reflection coefficient series), thereby resulting in a number of modified reflection coefficient series equivalent to the above-mentioned predetermined number of modified log-pairs.

7. Produce Modified Synthetic Seismograms

The seismic wavelet obtained in step 4 is convolved with each of the modified reflection coefficients (in the same manner as described in step 4 with respect to the reference synthetic seismogram) to produce a corresponding modified synthetic seismogram, thereby resulting in a number of modified synthetic seismograms equivalent to the above-mentioned predetermined number of modified log-pairs. Each of the modified synthetic seismograms have reflection events corresponding to the upper and lower boundaries of the layer and also have associated therewith the value(s) of the petrophysical property or properties associated with the corresponding modified log-pair.

8. Compare Nonreference Seismic Traces to Modified Synthetic Seismograms

A comparison window of each nonreference seismic trace is compared to a corresponding comparison window of each of the modified synthetic seismograms, where each comparison window includes the reflection events corresponding to the upper and lower boundaries of layer 12. Each comparison window is preferably identical in terms of time or depth and is sufficiently large to include the above-mentioned pair of reflection events for each trace. Preferred comparison techniques are discussed below, but any comparison technique can be employed according to certain broad aspects of the invention.

Comparisons of this step can employ simple crosscorrelation so that each comparison yields a crosscorrelation value. Or, the comparisons can employ calculation of difference mismatch error (previously defined).

Most preferably, however, a combination of crosscorrelation and difference mismatch error can be employed in the following series of steps as applied to comparison of a nonreference seismic trace and a modified synthetic seismogram, where each of the nonreference seismic trace and modified synthetic seismogram is defined by a series of data points at predetermined sample intervals (i.e. time): (i) shifting the modified synthetic seismogram with respect to the nonreference seismic trace a predetermined number of times with different corresponding sample shifts; (ii) crosscorrelating the modified synthetic seismogram and the nonreference seismic trace for each of the shifts in (i) to give a crosscorrelation value for each shift; (iii) selecting the shift which gives the maximum crosscorrelation value; and (iv) calculating the difference mismatch error between the modified synthetic seismogram, as shifted in accordance with the shift selected in (iii), and the nonreference seismic trace. Of course, it is also possible in the above steps to shift the nonreference seismic trace or to shift both the nonreference seismic trace and modified synthetic seismogram.

9. Select Modified Synthetic Seismograms for Each Nonreference Seismic Trace With respect to each nonreference seismic trace (T1–T27 and T28–T55), those modified synthetic seismograms are selected which match such nonreference seismic trace sufficiently in step 8 to pass at least one predetermined matching threshold.

Where the comparison in step 8 is by either crosscorrelation or difference mismatch error, the matching threshold could be designated as a minimum crosscorrelation value (i.e. 0.90 or 0.95) in the case of crosscorrelation or a maximum difference mismatch error value in the case of difference mismatch error. The matching threshold could also simply be designated as being passed by a preselected number n of modified synthetic seismograms whose comparison with a nonreference seismic trace provides the top n matches (i.e. n modified synthetic seismograms of the total number of such seismograms having the correspond zing n highest crosscorrelation values or n lowest difference mismatch error values).

Where the comparison in step 8 is by a combination of crosscorrelation and difference mismatch error, either or both of the above-described matching thresholds associated with crosscorrelation and difference mismatch error could be employed. The comparison procedure used in a subsequent example utilizes a matching threshold with respect to crosscorrelation as well as a matching threshold with respect to difference mismatch error.

10. Assigning Values of Petrophysical Property or Properties to Each Nonreference Seismic Trace and Corresponding Nonreference Location To each nonreference seismic trace there is assigned the values of the petrophysical property or properties associated with the modified synthetic seismograms which are selected in step 9 with respect to such nonreference seismic trace, thereby providing a range of such values associated with such nonreference seismic trace and with the corresponding nonreference lateral location. By way of example with respect to the petrophysical property net porosity and a particular nonreference lateral location, this step would result in a range of possible net porosity values corresponding to the nonreference lateral location, where such range consists of a highest possible net porosity value, a lowest possible net porosity value, and the most likely net porosity value which is associated with the modified synthetic seismogram best matching the nonreference seismic trace corresponding to the nonreference lateral location.

The values assigned as discussed above can be displayed in any convenient manner, such as a numerical display of the lowest, highest, and most likely value(s) for each nonreference lateral location, a graphical plot display of the various values for each nonreference lateral location, a color coded map of most likely values, etc.

Example

This example demonstrates the effectiveness of the invention in determining a petrophysical property associated with a subterranean layer.

Steps 1–10 of the inventive method as previously described were carried out with respect to a field of over 3,000 acres and a particular layer of interest in such field having upper and lower boundaries at depths of about 10,200 feet and 10,325 feet, respectively. Fifteen reference wells at 15 corresponding reference lateral locations in the field were employed to determine an average value of a petrophysical property (in this case, net porosity) associated with the layer for each of four nonreference wells at four corresponding nonreference lateral locations. Details of each step are given below.

1. Reference seismic traces corresponding to the reference wells and nonreference seismic traces corresponding to the nonreference wells were taken from a set of 3-D seismic data for the field. Each of such seismic traces corresponded to the lateral locations of the wells or to the locations closely adjacent (i.e. within 25 feet) to the well location.

2. Velocity and density logs for each of the reference wells were obtained as follows for the layer of interest, where each pair of such velocity and density derivative logs make up a reference log-pair. Velocity (sonic) and density wireline well logs were employed in combination with gamma, spontaneous potential, and resistivity wireline well logs to derive s porosity ($\Phi$) log. A water saturation ($S_w$) log was derived from resistivity or induction wireline well logs. A lithological ($V_{sh}$) log was derived from a gamma wireline well log. The thus derived porosity, water saturation, and lithelogical logs were employed to derive velocity (sonic) and density logs via standard transit time ($\Delta T$, travel time of a seismic wave through 1 foot of the layer, equivalent to the inverse of velocity) and density ($\rho$) equations, as are set forth as equations (1) (Wyllie time average equation) and (2) (bulk density equation) in the article "Incremental Pay Thickness Modeling of Hydrocarbon Reservoirs" by Dennis B. Neff, *Geophysics,* vol. 55, no. 5 (May 1990), which is hereby incorporated by reference.

3. A total of 15 reflection coefficient series were derived from the 15 corresponding reference log-pairs.

4. Six different test seismic wavelets were extracted from a 500 millisecond window of a line of 50 traces taken from the above-mentioned set of 3-D seismic data, wherein each of the six test wavelets were based on different amplitude, frequency, and/or phase values. Each of such test wavelets were convolved with the reference reflection coefficient series of five selected reference wells to thereby produce five reference synthetic seismograms for each test wavelet. Each set of five reference synthetic seismograms was compared to the corresponding reference seismic traces. Such comparison was interpretative, or subjective, in nature, relying primarily on crosscorrelation. One of the test wavelets was selected, based on the above-mentioned comparison, as the wavelet producing the reference synthetic seismograms best matching the corresponding reference seismic traces.

5. For each of the 15 reference wells, between 25 and 50 modified log-pairs were derived by varying porosity and/or water saturation, as well as layer thickness, with respect to the known porosity and water saturation logs from step 2. Variations of amplitudes of the known porosity and/or water saturation logs ranged from about 10–25%, and variations in layer thickness were made in 20 foot increments of not more than ±40 feet. These variations were made in a relatively random manner, varying thickness in each case, sometimes varying porosity and water saturation concurrently, and in other cases varying either porosity or water saturation only. A total of 457 modified log-pairs resulted, where each such log-pair has associated therewith a lithological composition log, a porosity log, and a water saturation log from which net pay thickness and net pore thickness values are determined in the manner described in the detailed description of step 5 by assuming minimum "pay threshold" values.

6. A modified reflection coefficient series was determined for each of the 457 modified log-pairs to thereby result in 457 modified reflection coefficient series.

7. Each of the 457 modified reflection coefficient series was convolved with the seismic wavelet selected in step 4 to result in 457 modified synthetic seismograms, where each such modified synthetic seismogram has associated therewith a net pay thickness value and net pore thickness value from step 5.

8. A comparison window (40 milliseconds) of each nonreference seismic trace from step 1 was compared to a corresponding comparison window of each of the 457 modified synthetic seismograms by a combination of crosscorrelation and difference mismatch error. The upper and lower limits of each comparison window included reflection events corresponding to the respective upper and lower reflecting boundaries of the layer, such that such reflection events were centered within such comparison window. The comparison was carried out in accordance with the preferred comparison procedure comprising substeps (i)–(iv) as described above in the detailed description of step 8, wherein 11 sample shifts were employed in substep (i). Consequently, the comparison of each nonreference seismic trace to each of the 457 modified synthetic seismograms resulting in a maximum crosscorrelation value and difference mismatch error value corresponding to each modified synthetic seismogram.

9. For each nonreference seismic trace, 15 of the 457 modified synthetic seismograms were selected as having the 15 highest crosscorrelation values (passing a first matching threshold). Of the thus selected 15 modified synthetic seismograms, seven were selected as having the seven lowest difference mismatch error values (passing a second matching threshold). Such seven modified synthetic seismograms are hereafter denoted as modified synthetic seismograms 1–7, where seismogram 1 has the lowest corresponding difference mismatch error value and seismogram 7 has the highest corresponding difference mismatch error value.

10. For each nonreference seismic trace, the net pore thickness and net pay thickness values associated with the selected modified synthetic seismograms 1–7 are assigned to such nonreference seismic trace, to thereby provide a range of net pore thickness and net pay thickness values associated with such nonreference seismic trace and its corresponding nonreference well.

To facilitate a determination of the effectiveness of the invention, a single net porosity value (an average) was calculated for each nonreference well based on net porosity values obtained by the invention, and a comparative net porosity value was obtained for each nonreference well by conventional means for the purpose of comparison.

A single net porosity value (average) was determined for each nonreference well in accordance with the invention by first calculating a net porosity value for each of the corresponding modified synthetic seismograms 1–7 from the net pore thickness value and net pay thickness value (net pore thickness/net pay thickness) associated with each such seismogram, and then determining an average of the thus calculated net porosity values 1–7 (NPV1–NPV7) corresponding to modified synthetic seismograms 1–7. The average is calculated from the following formula: [(3×NPV1)+ 2×(NPV2+NPV3+NP4)+NPV5+NPV6+NPV7]/12.

Comparative net porosities were obtained for each of the nonreference wells as follows, employing data obtained by wireline well logs of the layer of interest. For each nonreference well, lithological ($V_{sh}$) porosity ($\Phi$) and water saturation ($S_w$) logs were derived in the same general manner as such logs were derived for the reference wells. From these logs, the pay intervals were determined assuming the same "pay threshold" values employed in step 5 of the invention as carried out in this example. A net porosity value was determined from the porosity log, assuming the previously determined pay intervals, by calculating the average porosity in the pay intervals in the manner discussed in the detailed description of step 5 (sum of porosity values at predetermined increments within pay intervals, divided by number of increments).

The Table illustrates the above net porosity ($\Phi$) results so as to provide a clear comparison between the net porosity values obtained by the invention and the comparative net porosity values. The Table sets forth the net porosity values, the variance of the invention net porosity from the comparative net porosity, as well as the error (absolute value of the variance/comparative net porosity.

TABLE

| Well | Comparative Net $\Phi$ (%) | Invention Net $\Phi$ (%) | Variance (%) | Error (%) |
|---|---|---|---|---|
| 1 | 23.1 | 21 | −2.1 | 9 |
| 2 | 29.0 | 25 | −4.0 | 14 |
| 3 | 15.3 | 18 | +2.7 | 18 |
| 4 | 25.3 | 22 | −3.2 | 13 |

The Table clearly shows the excellent accuracy of the invention in determining a petrophysical property of a subterranean layer at a particular lateral location, based on limited log data from only 15 other lateral locations and also seismic data. It should be noted in particular that the invention could be similarly employed to determine a petrophysical property or properties associated with the layer at any lateral location in the field of this example, which as noted above covers over 3,000 acres. In effect, the invention integrates limited log data and seismic data for a layer of interest in a particular field so as to enable fast and economical determination of a petrophysical property or properties of such layer at any lateral location in the field.

Computer Program

The data processing steps described above are performed by computer.

Five important subroutines of a computer program for accomplishing these data processing steps of the invention are set forth in Appendix I. Such subroutines are written in "C" language for a Sparc-10 computer manufactured by Sun, and is self explanatory to one skilled in the use of the Sparc-10 computer.

"Subroutine A" generates a set of modified log-pairs (each comprising a 1/v ($\Delta$T) log and a $\rho$ log), and requires as input data a reference set of logs in digital form, including $V_{sh}$, $\Phi$, and $S_w$ logs. "Subroutine B" reads into computer memory a set of nonreference seismic traces, the estimated time position on such traces corresponding to the upper boundary of the layer of interest, and the modified synthetic seismograms resulting from convolution of a seismic wavelet with modified reflection coefficients determined from the modified log-pairs. "Subroutine C" calculates gross pay thickness, net pay thickness, net pore thickness, net porosity, and hydrocarbon pore volume values for each of the modified log-pairs and corresponding modified synthetic seismograms, and requires as input data each modified set of $V_{sh}$, $\Phi$, and $S_w$ logs from which each of the modified log-pairs was derived. "Subroutine D" compares each nonreference seismic trace to each modified synthetic seismogram by crosscorrelation so as to calculate a crosscorrelation value for each of a number of shifts of a particular modified synthetic seismogram, and requires a desired number and magnitude of shifts as input data. "Subroutine E" determines the maximum crosscorrelation value for each modified synthetic seismogram as compared to a nonreference seismic trace, and calculates the difference mismatch error for each modified synthetic seismogram as shifted to give the maximum crosscorrelation value. "Subroutine F" selects m modified synthetic seismograms as compared to a nonreference trace having the m highest maximum crosscorrelation values, and of such m seismograms selects n seismograms having the n lowest difference mismatch error values, where m and n are integers and n<m. Subroutine F therefore requires m and n as input data. Subroutine F also provides an output of the gross pay thickness, net pay thickness, net pore thickness, hydrocarbon pore volume, and net porosity values corresponding to each of the selected m seismograms, and calculates and provides as an output a weighted average of such values for the selected n seismograms.

Conclusion

Thus, there is provided by the present invention an effective method of determining the value of a desired petrophysical property of a layer at any lateral location thereof which requires a minimal amount of log data. Obviously many modifications and variations of the present invention are possible in light of the above teachings. It is therefore to be understood that within the scope of the appended claims the invention may be practiced otherwise than as specifically described.

Appendix I

SUBROUTINE A

```
int compute_num_states(layrs)
    struct layr_info *layrs;
{
    int tot_states, i, j;

/* Calculate number of steps per layer, number of states per layer, */
    /* partial step sizes for each layer, and total number of states for */
    /* this model. */ tot_states = 1;
    for(i=0; i<layrs->nl; i++)                          /* For each layer..... */
    {
        layrs->nsteps[i] = (int) (layrs->nsamp[i] / layrs->step_size[i]);
        if((layrs->nsamp[i] % layrs->step_size[i]) != 0)
        {
            layrs->last_step_size[i] = layrs->nsamp[i] - (layrs->nsteps[i] *
                layrs->step_size[i]);
            layrs->nsteps[i]++;
        }
        else
            layrs->last_step_size[i] = layrs->step_size[i];

if((layrs->inc_type[i] == 0) || (layrs->inc_type[i] == 1))
            layrs->nstates[i] = layrs->nsteps[i] + 1;
        if(layrs->inc_type[i] == -1)
        {
            layrs->nstates[i] = 2;
            for(j=1; j<layrs->nsteps[i]; j++)
                layrs->nstates[i] *= 2;
        }
        tot_states *= layrs->nstates[i];
    }

/* Calculate layer divisors. */ layrs->d[0] = tot_states / layrs->nstates[0];
    for(i=1; i<layrs->nl; i++)
        layrs->d[i] = layrs->d[i-1] / layrs->nstates[i];

return(tot_states);
}
```

```
void compute_layer_states(layrs, mod_state)
   struct layr_info *layrs;
   int mod_state;
{
   int j;

for(j=0; j<layrs->nl; j++)                  /* Update current states */
   {                                           /* of all layers.        */
      layrs->state[j] = (int) (mod_state / layrs->d[j]);
      mod_state -= (layrs->state[j] * layrs->d[j]);
   }
}
```

```
void build_sngl_comp_log(layrs, init, repl, comp)
    struct layr_info *layrs;
    float *init, *repl, *comp;
{
    int j, k, offset;
    unsigned short bitpat;

for(j=0; j<layrs->nl; j++)                          /* For each layer.... */
    {
        switch(layrs->inc_type[j])
        {
            case 0:                                     /* If top-down.... */
                if(layrs->state[j] == 0)
                    copy(init + layrs->l_offset[j], comp + layrs->l_offset[j],
                        layrs->nsamp[j]);
                else
                {
                    if(layrs->state[j] == layrs->nsteps[j])
                        copy(repl + layrs->l_offset[j], comp + layrs->l_offset[j],
                            layrs->nsamp[j]);
                    else
                        copy(repl + layrs->l_offset[j], comp + layrs->l_offset[j],
                            (layrs->step_size[j] * layrs->state[j]));
                }
                break;
            case 1:                                     /* If bottom-up.... */
                if(layrs->state[j] == 0)
                    copy(init + layrs->l_offset[j], comp + layrs->l_offset[j],
                        layrs->nsamp[j]);
                else
                {
                    offset = layrs->l_offset[j] + layrs->nsamp[j] -
                        (layrs->state[j] * layrs->step_size[j]);
                    if(layrs->state[j] == layrs->nsteps[j])
                        copy(repl + layrs->l_offset[j], comp + layrs->l_offset[j],
                            layrs->nsamp[j]);
                    else
                        copy(repl + offset, comp + offset, (layrs->step_size[j] *
                            layrs->state[j]));
                }
                break;
            case -1:                                    /* If random..... */
                bitpat = (unsigned int) layrs->state[j];
                for(k=0; k<layrs->nsteps[j] - 1; k++)
                {
                    offset = layrs->l_offset[j] + (k * layrs->step_size[j]);
                    if(bitpat & 0x0001)
                        copy(repl + offset, comp + offset, layrs->step_size[j]);
                    else
                        copy(init + offset, comp + offset, layrs->step_size[j]);
```

```
            bitpat >>= 1;
        }
        offset += layrs->step_size[j];
        if(bitpat & 0x0001)
            copy(repl + offset, comp + offset, layrs->last_step_size[j]);
        else
            copy(init + offset, comp + offset, layrs->last_step_size[j]);
        break;
    }
  }
}
```

```
void build_cumu_comp_log(layrs, init, repl, comp)
   struct layr_info *layrs;
   float *init, *repl, *comp;
{
   int j, k, offset;
   unsigned short bitpat, prev_bitpat, ord;

for(j=0; j<layrs->nl; j++)                    /* For each layer.... */
   {
      if(layrs->state[j] != layrs->prev_state[j]) /* If state has changed.. */
      {
         switch(layrs->inc_type[j])
         {
            case 0:                               /* If top-down.... */
               if(layrs->state[j] == 0)
                  copy(init + layrs->l_offset[j], comp + layrs->l_offset[j],
                       layrs->nsamp[j]);
               else
               {
                  offset = layrs->l_offset[j] + ((layrs->state[j] - 1) *
                           layrs->step_size[j]);
                  if(layrs->state[j] == layrs->nsteps[j])
                     copy(repl + offset, comp + offset, layrs->last_step_size[j]);
                  else
                     copy(repl + offset, comp + offset, layrs->step_size[j]);
               }
               break;
            case 1:                               /* If bottom-up.... */
               if(layrs->state[j] == 0)
                  copy(init + layrs->l_offset[j], comp + layrs->l_offset[j],
                       layrs->nsamp[j]);
               else
               {
                  offset = layrs->l_offset[j] + layrs->nsamp[j] -
                           (layrs->state[j] * layrs->step_size[j]);
                  if(layrs->state[j] == layrs->nsteps[j])
                     copy(repl + layrs->l_offset[j], comp + layrs->l_offset[j],
                          layrs->last_step_size[j]);
                  else
                     copy(repl + offset, comp + offset, layrs->step_size[j]);
               }
               break;
            case -1:                              /* If random..... */
               bitpat = (unsigned int) layrs->state[j];
               prev_bitpat = (unsigned int) layrs->prev_state[j];
               ord = bitpat ^ prev_bitpat;
               for(k=0; k<layrs->nsteps[j] - 1; k++)
               {
                  if(ord & 0x0001)
                  {
```

```
            offset = layrs->l_offset[j] + (k * layrs->step_size[j]);
            if(bitpat & 0x0001)
                copy(repl + offset, comp + offset, layrs->step_size[j]);
            else
                copy(init + offset, comp + offset, layrs->step_size[j]);
            bitpat >>= 1;
            ord >>= 1;
        }
    }
    if(ord & 0x0001)
    {
        offset = layrs->l_offset[j] + (k * layrs->step_size[j]);
        if(bitpat & 0x0001)
            copy(repl + offset, comp + offset, layrs->last_step_size[j]);
        else
            copy(init + offset, comp + offset, layrs->last_step_size[j]);
    }
    break;
            }
        }
    }
}
```

SUBROUTINE B

```c
#include <stdio.h>
#include <io.h>
#include <malloc.h>
#include <string.h>
#include <stdlib.h>
#include "nui.h"

void IbmToIeee(float *, float *, int);
int flipit(int);
long longflip(long);

int get_num_traces(FILE *segfile, long numbytes)
{
    int numsamp = 0, numtr = 0;
    long loc = 3714;

while(loc < numbytes)
    {
        fseek(segfile, loc, SEEK_SET);
        fread(&numsamp, sizeof(int), 1, segfile);
        numsamp = flipit(numsamp);
        numtr++;
        loc += (240 + (4 * numsamp));
    }
    return(numtr);
} long get_size(FILE *pcfile)
{
    int fh;

fh = fileno(pcfile);
    return(filelength(fh));
} void hpprint(struct modattrib *iptattrib, int first, int last)
{
    FILE *prnfile;
    int i;

prnfile = fopen("prn", "w");

fprintf(prnfile, "\x1B&k2S");
    fprintf(prnfile, "\x1B&l9D");

fprintf(prnfile, "IPT Attribute Printout\n\n\n");
    fprintf(prnfile, "CDP PK.  AMP TRO  AMP APP  ISO ACT  ISO TIM  TRO TIM  PK. ");
    fprintf(prnfile, "TIM TOP  TIM BAS  NET PAY  NET POR  GRO PAY  POR VOL ");
    fprintf(prnfile, " DT SAG   TOP-PK   BAS-PK   BAS-TR\n");
    fprintf(prnfile, "--- -------  -------  -------  -------  -------  ------- ");
```

```
    fprintf(prnfile, "------- ------- ------- ------- ------- ------- ");
    fprintf(prnfile, "------- ------- ------- -------\n");

for(i=first; i<=last; i++)
    {
        fprintf(prnfile, "%3d ", iptattrib[i].cdp_num);
        fprintf(prnfile, "%7.4f %7.4f %7.2f %7.2f %7.2f %7.2f %7.2f ",
                iptattrib[i].peak_amp,
                iptattrib[i].trough_amp,
                iptattrib[i].appar_Iso,
                iptattrib[i].act_iso,
                iptattrib[i].time_trough,
                iptattrib[i].time_peak,
                iptattrib[i].time_top_pay);
        fprintf(prnfile, "%7.2f %7.2f %7.2f %7.2f %7.2f %7.2f %7.2f %7.2f %7.2f\n"
                iptattrib[i].time_base_pay,
                iptattrib[i].net_pay,
                iptattrib[i].net_por_ft,
                iptattrib[i].gross_pay,
                iptattrib[i].hc_por_vol,
                iptattrib[i].dt_sag,
                iptattrib[i].top_peak,
                iptattrib[i].base_peak,
                iptattrib[i].base_trough);
    }
    fprintf(prnfile, "\x1B");
    fprintf(prnfile, "E");
    fclose(prnfile);
} void get_seg_tr(FILE *segfile, long stbyte, int num_pts, float *output)
{
    float *tempibm;

tempibm = calloc(num_pts, sizeof(float));
    fseek(segfile, stbyte, SEEK_SET);
    fread(tempibm, sizeof(float), num_pts, segfile);
    IbmToIeee(tempibm, output, num_pts);
    free(tempibm);
} void get_iptsegtrc_hdr(FILE *segfile, long fileloc, struct modattrib *output)
{
    union
    {
        float fval[60];
        long  lval[60];
        int   ival[120];
    } trc_hdr;
```

```c
    fseek(segfile, fileloc, SEEK_SET);
    fread(trc_hdr.fval, sizeof(float), 60, segfile);

output->start_byte = fileloc + 240;
    output->cdp_num    = longflip(trc_hdr.lval[5]);
    output->nsamp      = flipit(trc_hdr.ival[57]);
    output->delay      = flipit(trc_hdr.ival[54]);
    output->srate      = (flipit(trc_hdr.ival[58]))/1000;
    IbmToIeee((float *) &trc_hdr.fval[43], (float *) &output->trough_amp, 17);
} void get_segtrc_hdr(FILE *segfile, long fileloc, struct trcattrib *output)
{
    union
    {
        float fval[60];
        long  lval[60];
        int   ival[120];
    } trc_hdr;

fseek(segfile, fileloc, SEEK_SET);
    fread(trc_hdr.fval, sizeof(float), 60, segfile);

output->start_byte = fileloc + 240;
    output->cdp_num    = longflip(trc_hdr.lval[5]);
    output->nsamp      = flipit(trc_hdr.ival[57]);
    output->delay      = flipit(trc_hdr.ival[54]);
    output->srate      = (flipit(trc_hdr.ival[58]))/1000;
    IbmToIeee((float *) &trc_hdr.fval[50], (float *) &output->top_pay_pick, 1);
} void get_lmksegtrc_hdr(FILE *segfile, long fileloc, struct trcattrib *output)
{
    union
    {
        float fval[60];
        long  lval[60];
        int   ival[120];
    } trc_hdr;

fseek(segfile, fileloc, SEEK_SET);
    fread(trc_hdr.fval, sizeof(float), 60, segfile);

output->start_byte = fileloc + 240;
    output->cdp_num    = longflip(trc_hdr.lval[5]);
    output->nsamp      = flipit(trc_hdr.ival[57]);
    output->delay      = -flipit(trc_hdr.ival[52]);
    output->srate      = (flipit(trc_hdr.ival[58]))/1000;
    IbmToIeee((float *) &trc_hdr.fval[50], (float *) &output->top_pay_pick, 1);
    if((output->top_pay_pick > 6000) || (output->top_pay_pick <= 0))
```

```
            output->error_flag = 1;
}
```

SUBROUTINE C

```c
void paystats(model, layers, trstats, paylog, porlog, swlog)
   IPTModelHeader *model;
   IPTLayerInfo *layers;
   IPTTraceParams *trstats;
   float *paylog;
   float *porlog;
   float *swlog;
{
   float *payptr1, *payptr2, *porptr1, *porptr2, *swptr1, *swptr2;
   int i;

for(i=0; i<model->num_layers; i++)
   {
      payptr1 = paylog + layers[i].layer_offset;
      payptr2 = payptr1 + layers[i].nsamps_layer - 1;
      porptr1 = porlog + layers[i].layer_offset;
      porptr2 = porptr1 + layers[i].nsamps_layer - 1;
      swptr1 = swlog + layers[i].layer_offset;
      swptr2 = swptr1 + layers[i].nsamps_layer - 1;

trstats->net_pay[i] = 0;
      trstats->layer_pore_feet[i] = 0;
      trstats->gross_pore_feet[i] = 0;
      trstats->net_pore_feet[i] = 0;
      trstats->layer_hpv[i] = 0;
      trstats->gross_hpv[i] = 0;
      trstats->net_hpv[i] = 0;
      trstats->thickness[i] = payptr2 - payptr1 + 1;

while((*payptr1 == 0) && (payptr1 <= payptr2))
      {
         trstats->layer_pore_feet[i] += *porptr1 / 100;
         trstats->layer_hpv[i] += *porptr1 * (100 - *swptr1) / 10000;
         payptr1++;
         porptr1++;
         swptr1++;
      }
      while((*payptr2 == 0) && (payptr2 >= payptr1))
      {
         trstats->layer_pore_feet[i] += *porptr2 / 100;
         trstats->layer_hpv[i] += *porptr2 * (100 - *swptr2) / 10000;
         payptr2--;
         porptr2--;
         swptr2--;
      }
      trstats->gross_pay[i] = payptr2 - payptr1 + 1;
      if(trstats->gross_pay[i] == 0)
      {
         layers[i].top_gross_offset = (int) NULL_VAL;
         layers[i].base_gross_offset = (int) NULL_VAL;
```

```
        }
        else
        {
            layers[i].top_gross_offset = payptr1 - paylog;
            layers[i].base_gross_offset = payptr2 - paylog;
        }
        for(; payptr1<=payptr2; payptr1++, porptr1++, swptr1++)
        {
            trstats->layer_pore_feet[i] += *porptr1 / 100;
            trstats->layer_hpv[i] += *porptr1 * (100 - *swptr1) / 10000;
            trstats->gross_pore_feet[i] += *porptr1 /100;
            trstats->gross_hpv[i] += *porptr1 * (100 - *swptr1) / 10000;
            if(*payptr1 != 0)
            {
                trstats->net_pay[i]++;
                trstats->net_pore_feet[i] += *porptr1 / 100;
                trstats->net_hpv[i] += *porptr1 * (100 - *swptr1) / 10000;
            }
        }
        if(trstats->gross_pay[i] == 0)
        {
            trstats->net_gross_ratio[i] = 0;
            trstats->gross_avg_porosity[i] = NULL_VAL;
            trstats->net_avg_porosity[i] = NULL_VAL;
            trstats->gross_avg_sw[i] = NULL_VAL;
            trstats->net_avg_sw[i] = NULL_VAL;
        }
        else
        {
            trstats->net_gross_ratio[i] = (float) trstats->net_pay[i] /
                (float) trstats->gross_pay[i];
            trstats->gross_avg_porosity[i] = trstats->gross_pore_feet[i] /
                trstats->gross_pay[i] * 100;
            trstats->net_avg_porosity[i] = trstats->net_pore_feet[i] /
                trstats->net_pay[i] * 100;
            trstats->gross_avg_sw[i] = ((trstats->gross_pore_feet[i] -
                trstats->gross_hpv[i]) / trstats->gross_pore_feet[i])
                * 100;
            trstats->net_avg_sw[i] = ((trstats->net_pore_feet[i] -
                trstats->net_hpv[i]) / trstats->net_pore_feet[i]) * 100;
        }
        trstats->layer_avg_porosity[i] = trstats->layer_pore_feet[i] /
            trstats->thickness[i] * 100;
        trstats->layer_avg_sw[i] = ((trstats->layer_pore_feet[i] -
            trstats->layer_hpv[i]) / trstats->layer_pore_feet[i]) * 100;
    }
}
```

SUBROUTINE D

```c
#include <stdio.h>
#include <io.h>
#include <malloc.h>
#include <string.h>
#include <math.h>
#include <stdlib.h>
#include "nui.h"
#include <conio.h>
#define PAUSE printf("\nPress any key to continue.....\n"); getch()

void IbmToIeee(float *, float *, int);
int flipit(int);
long longflip(long);
int get_num_traces(FILE *, long);
long get_size(FILE *);
void hpprint(struct modattrib *, int, int);
void get_seg_tr(FILE *, long, int, float *);
void shortXC(float *, float *, int, int, float *);
void get_iptsegtrc_hdr(FILE *, long, struct modattrib *);
void get_lmksegtrc_hdr(FILE *, long, struct trcattrib *);
void get_segtrc_hdr(FILE *, long, struct trcattrib *);
void max_and_lag(float *, int, float *, int *);
double sumsq(float *, int);
float difference(float *, float *, int);
float dual_sign_bit(float *, float *, int);
void correlate(float *, int, float *, int, float *);
void hilbt_oper(float *, int);
void phs_and_lag(float *, int, float *, int, float *, float *, int *);

void nuifunc(void)
{
   struct modattrib *iptattrib;
   struct trcattrib *seisattrib;
   struct compare *comp;
   struct compare_file_hdr *comphdr;
   char in_name[30], answer[10], trstr[5];
   FILE *modfile, *seisfile, *compfile;
   int i, numtrm, numtrt, trace, index, fstpr, lstpr, numpts, stsamp, zerlag;
   int delay, j, stpoint, k, diffpoint, startindex, endindex;
   int mincdpfil, maxcdpfil, mincdpproc, maxcdpproc, pad = 0, nlags;
   int fix_win_flag, fix_win_len, skew_offset;
   long numbytesm, numbytest, fileloc, stbyte;
   float *modseg, *trcseg, *crossout, *hbtoper, *quadrature, *fullcross;
   float qfact, rel_seis_gain;

/* Get name of SEGY format seismic trace file. */ printf("SEGY seismic trace file name? ");
   in_name[0] = '\0';
   gets(in_name);
```

```c
    while((seisfile = fopen(in_name, "rb")) == NULL)
    {
        printf("\nFile not found! Try again.\n");
        printf("SEGY seismic trace file name? ");
        in_name[0] = '\0';
        gets(in_name);
    } printf("Checking file.........\n\n");

numbytest = get_size(seisfile);
    numtrt = get_num_traces(seisfile, numbytest);

printf("Number of bytes in trace file is %ld\n", numbytest);
    printf("Total number of traces in this file is %d\n\n", numtrt);

printf("Building trace attribute structure........\n\n");

seisattrib = calloc(numtrt, sizeof(struct trcattrib));
    fileloc = 3600;
    if(LMKSOURCE)
        for(i=0; i<numtrt; i++)
        {
            get_lmksegtrc_hdr(seisfile, fileloc, &seisattrib[i]);
            fileloc += 240 + (4 * seisattrib[i].nsamp);
        }
    else
        for(i=0; i<numtrt; i++)
        {
            get_segtrc_hdr(seisfile, fileloc, &seisattrib[i]);
            fileloc += 240 + (4 * seisattrib[i].nsamp);
        }

/* Determine the sesimic CDP range to be processed. */ mincdpfil = (int) seisattrib[0].cdp_num;
    maxcdpfil = mincdpfil + numtrt - 1;

mincdpproc = mincdpfil;
    printf("\nThe CDP range represented by your seismic file is %d to %d.\n\n",
        mincdpfil, maxcdpfil);
    printf("Enter the first CDP to process.\n");
    printf("Default = %d.\n", mincdpfil);
    printf("===> ");
    answer[0] = '\0';
    gets(answer);
    if(strlen(answer) != 0)
    {
        mincdpproc = atoi(answer);
        while((mincdpproc < mincdpfil) || (mincdpproc > maxcdpfil))
```

```
        mincdpproc = mincdpfil;
        printf("\nEntry out of range.....try again!\n");
        printf("===> ");
        answer[0] = '\0';
        gets(answer);
        if(strlen(answer) != 0)
            mincdpproc = atoi(answer);
    }
} maxcdpproc = maxcdpfil;
printf("\nThe CDP range represented by your seismic file is %d to %d.\n\n",
    mincdpfil, maxcdpfil);
printf("Enter the last CDP to process.\n");
printf("Default = %d.\n", maxcdpfil);
printf("===> ");
answer[0] = '\0';
gets(answer);
if(strlen(answer) != 0)
{
    maxcdpproc = atoi(answer);
    while((maxcdpproc < mincdpfil) || (maxcdpproc > maxcdpfil))
    {
        maxcdpproc = maxcdpfil;
        printf("\nEntry out of range.....try again!\n");
        printf("===> ");
        answer[0] = '\0';
        gets(answer);
        if(strlen(answer) != 0)
            maxcdpproc = atoi(answer);
    }
}

/* Determine the gain which should be applied to the seismic data to */
/* amplitude-balance it with the model data. */ rel_seis_gain = 1;
printf("\nEnter the relative gain factor to be applied to the seismic\n");
printf("data to amplitude-balance it with the model data.\n");
printf("Default = %f.\n", rel_seis_gain);
printf("===> ");
answer[0] = '\0';
gets(answer);
if(strlen(answer) != 0)
{
    rel_seis_gain = (float) atof(answer);
    while(rel_seis_gain == 0)
    {
        rel_seis_gain = 1;
```

```
            printf("\nEntry out of range.....try again!\n");
         printf("===> ");
         answer[0] = '\0';
         gets(answer);
         if(strlen(answer) != 0)
            rel_seis_gain = (float) atof(answer);
      }
   }

/* Get name of SEGY format IPT model traces file. */ printf("\nIPT SEGY model file name? ");
   gets(in_name);
   while((modfile = fopen(in_name, "rb")) == NULL)
   {
      printf("\nFile not found! Try again.\n");
      printf("IPT SEGY model file name? ");
      in_name[0] = '\0';
      gets(in_name);
   } printf("Checking file.........\n\n");

numbytesm = get_size(modfile);
   numtrm = get_num_traces(modfile, numbytesm);

printf("Number of bytes in model file is %ld\n", numbytesm);
   printf("Total number of traces in this file is %d\n\n", numtrm);

printf("Building model attribute structure........\n\n");

iptattrib = calloc(numtrm, sizeof(struct modattrib));
   fileloc = 3600;
   comphdr = calloc(1, sizeof(struct compare_file_hdr));
   comphdr->min_nt_pay = 5000;
   comphdr->min_nt_pore_ft = 5000;
   comphdr->min_hc_vol = 5000;
   comphdr->max_nt_pay = 0;
   comphdr->max_nt_pore_ft = 0;
   comphdr->max_hc_vol = 0;

for(i=0; i<numtrm; i++)
   {
      get_iptsegtrc_hdr(modfile, fileloc, &iptattrib[i]);
      if(iptattrib[i].net_pay < comphdr->min_nt_pay)
         comphdr->min_nt_pay = iptattrib[i].net_pay;
      if(iptattrib[i].net_pay > comphdr->max_nt_pay)
         comphdr->max_nt_pay = iptattrib[i].net_pay;
      if(iptattrib[i].net_por_ft < comphdr->min_nt_pore_ft)
         comphdr->min_nt_pore_ft = iptattrib[i].net_por_ft;
```

```
      if(iptattrib[i].net_por_ft > comphdr->max_nt_pore_ft)
         comphdr->max_nt_pore_ft = iptattrib[i].net_por_ft;
      if(iptattrib[i].hc_por_vol < comphdr->min_hc_vol)
         comphdr->min_hc_vol = iptattrib[i].hc_por_vol;
      if(iptattrib[i].hc_por_vol > comphdr->max_hc_vol)
         comphdr->max_hc_vol = iptattrib[i].hc_por_vol;
      fileloc += 240 + (4 * iptattrib[i].nsamp);
}

/* Determine if fixed or variable windowing will be used. */ fix_win_flag = 0;
printf("\nIs the trace comparison window to be variable or fixed in length?\n
printf("V/F, Default = V\n");
printf("===> ");
answer[0] = '\0';
gets(answer);
if (strlen(answer) == 0)
   strcpy(answer, "v");
if(strcmpi(answer, "f") == 0)
   fix_win_flag = 1;

/* If the window is to be variable, determine the pad and */
/* possible skew offset. */ if(!fix_win_flag)
{
   pad = 15;
   printf("\nPlease enter the appropriate pad in msec.\n");
   printf("Default = 15 msec.\n");
   printf("===> ");
   answer[0] = '\0';
   gets(answer);
   if(strlen(answer) != 0)
       pad = atoi(answer);

skew_offset = 0;
   printf("\nNormally, the comparison window is centered on the model");
   printf(" zone of interest.\n");
   printf("Please enter any desired shift from this position in msec.\n");
   printf("Negative shifts window up, positive down.\n");
   printf("Default = 0\n");
   printf("===> ");
   answer[0] = '\0';
   gets(answer);
   if(strlen(answer) != 0)
       skew_offset = atoi(answer);
}

/* If the window is to be fixed, determine the window length including */
```

```c
/* pad and the offset between the model top and the window start. */ if(fix_win_flag)
{
    fix_win_len = 40;
    printf("\nPlease enter the length of the comparison window in msec.\n");
    printf("Default = 40 msec.\n");
    printf("===> ");
    answer[0] = '\0';
    gets(answer);
    if(strlen(answer) != 0)
        fix_win_len = atoi(answer);

skew_offset = -15;
    printf("\nPlease enter the the window start position in msec relative");
    printf(" to the top of the\nmodel zone of interest.\n");
    printf("Negative means window starts above, positive below.\n");
    printf("Default = -15\n");
    printf("===> ");
    answer[0] = '\0';
    gets(answer);
    if(strlen(answer) != 0)
        skew_offset = atoi(answer);
} nlags = 11;
printf("\nPlease enter the number of lags at which to calculate a\n");
printf("correlation coefficient.\n");
printf("Default = 11\n");
printf("===> ");
answer[0] = '\0';
gets(answer);
if(strlen(answer) != 0)
{
    nlags = atoi(answer);
    if((nlags % 2) == 0)            /* Make sure nlags is odd. */
        nlags++;
} printf("\nName for output statistics file? ");
in_name[0] = '\0';
gets(in_name);
compfile = fopen(in_name, "wb");

/* Fill remaining fields and write out compare file header. */ comphdr->st_cdp = mincdpproc;
comphdr->cdp_inc = 1;
comphdr->num_seis_trcs = maxcdpproc - mincdpproc + 1;
```

```c
 comphdr->num_modl_trcs = numtrm;
comphdr->xcorr_nlags = nlags;
comphdr->xcorr_pad = pad;
comphdr->fix_win_flag = fix_win_flag;
comphdr->fix_win_len = fix_win_len;
comphdr->skew_offset = skew_offset;
comphdr->rel_seis_gain = rel_seis_gain;

fwrite(comphdr, sizeof(struct compare_file_hdr), 1, compfile);
free(comphdr);

/* Display model attributes if desired.  */ printf("\nDo you wish to view the IPT model attributes?\n");
printf("Y/N, Default = N\n");
printf("===> ");
answer[0] = '\0';
gets(answer);
if (strlen(answer) == 0)
    strcpy(answer, "no");
if((strcmpi(answer, "y") == 0) || (strcmpi(answer, "yes") == 0))
{
    printf("\nView attributes for which model trace (sequential from 1)? ");
    gets(trstr);
    trace = atoi(trstr);
    index = --trace;

while(index>=0 && index<=numtrm-1)
    {
        printf("Starting byte       = %ld\n",   iptattrib[index].start_byte);
        printf("CDP number          = %ld\n",   iptattrib[index].cdp_num);
        printf("Number samples      = %d\n",    iptattrib[index].nsamp);
        printf("Delay               = %d\n",    iptattrib[index].delay);
        printf("Sample rate         = %d\n\n",  iptattrib[index].srate);
        printf("Peak amplitude      = %f\n",    iptattrib[index].peak_amp);
        printf("Trough amplitude    = %f\n",    iptattrib[index].trough_amp);
        printf("Apparent isochron   = %f\n",    iptattrib[index].appar_iso);
        printf("Actual isochron     = %f\n",    iptattrib[index].act_iso);
        printf("Trough time         = %f\n",    iptattrib[index].time_trough);
        printf("Peak time           = %f\n",    iptattrib[index].time_peak);
        printf("Time top pay        = %f\n",    iptattrib[index].time_top_pay);
        printf("Time base pay       = %f\n",    iptattrib[index].time_base_pay);
        printf("Net pay             = %f\n",    iptattrib[index].net_pay);
        printf("Net pore feet       = %f\n",    iptattrib[index].net_por_ft);
        printf("Gross pay           = %f\n",    iptattrib[index].gross_pay);
        printf("Hyd pore volume     = %f\n",    iptattrib[index].hc_por_vol);
        printf("DT sag              = %f\n",    iptattrib[index].dt_sag);
        printf("Top peak            = %f\n",    iptattrib[index].top_peak);
        printf("Base peak           = %f\n",    iptattrib[index].base_peak);
        printf("Base trough         = %f\n\n",  iptattrib[index].base_trough);
```

```
            printf("View attributes for which model trace (sequential from 1)? ");
            gets(trstr);
            trace = atoi(trstr);
            index = --trace;
        }
    }

/*  Print model attributes if desired.  */ printf("\nDo you wish to print the IPT model attributes?\n");
    printf("Y/N, Default = N\n");
    printf("===> ");
    answer[0] = '\0';
    gets(answer);
    if (strlen(answer) == 0)
        strcpy(answer, "no");
    if((strcmpi(answer, "y") == 0) || (strcmpi(answer, "yes") == 0))
    {
        printf("\nFirst model trace (sequential from 1) to print? ");
        scanf("%d", &fstpr);
        printf("\n\nLast model trace (sequential from 1) to print? ");
        scanf("%d", &lstpr);
        hpprint(iptattrib, fstpr, lstpr);
    }

/* Print out processing information. */ if(fix_win_flag)
    {
        printf("\nSelected windowing type is FIXED.\n");
        printf("The window length is %d msec.\n", fix_win_len);
        printf("The window begins %d msec above the model pay zone.\n\n",
            -skew_offset);
    }
    else
    {
        printf("\nSelected windowing type is VARIABLE.\n");
        printf("The window length includes a pad of %d msec above and below",
            pad);
        printf(" the model pay zone.\n");
        printf("The window begins %d msec above the model pay zone.\n\n", pad -
            skew_offset);
    }

/*  hbtoper = calloc(HILBLN, sizeof(float));
    hilbt_oper(hbtoper, HILBLN);                  */

/* Loop through seismic traces, getting whole trace one-at-a-time.  */
```

```
 startindex = mincdpproc - (int) seisattrib[0].cdp_num;
 endindex = startindex + maxcdpproc - mincdpproc + 1;
 comp = calloc(numtrm, sizeof(struct compare));

for(i=startindex; i<endindex; i++)        /* For each seismic trace...... */
 {
    if(seisattrib[i].error_flag == 1)
    {
       printf("Missing horizon pick on seismic trace %ld. Trace skipped.\n",
             seisattrib[i].cdp_num);
       for(j=0; j<numtrm; j++)
       {
          comp[j].seis_cdp = seisattrib[i].cdp_num;
          comp[j].mod_cdp = iptattrib[j].cdp_num;
          comp[j].zer_xcorr = 0;
          comp[j].max_xcorr = 0;
          comp[j].difference = 0;
          comp[j].phs_max_env = 0;
          comp[j].quality = 0;
          comp[j].signbit = 0;
          comp[j].lag_max_env = 0;
          comp[j].max_lag = 0;
       }
       fwrite(comp, sizeof(struct compare), numtrm, compfile);
       continue;       /* Skip this trace if no horizon pick. */
    } printf("Processing seismic trace %ld.........\n", seisattrib[i].cdp_num);

trcseg = calloc(seisattrib[i].nsamp, sizeof(float));
    get_seg_tr(seisfile, seisattrib[i].start_byte, seisattrib[i].nsamp, trcseg /* Scale seismic up by user-supplied factor to match model amplitudes. */ for(j=0; j<seisattrib[i].nsamp; j++)
       trcseg[j] *= rel_seis_gain;

if(fix_win_flag)
       stpoint = (int) (seisattrib[i].top_pay_pick + 0.5)
             - seisattrib[i].delay + skew_offset - ((nlags-1)/2);
    else
       stpoint = (int) (seisattrib[i].top_pay_pick + 0.5)
             - seisattrib[i].delay - pad + skew_offset - ((nlags-1)/2);

/* Loop through model traces, getting only desired portion. */ for(j=0; j<numtrm; j++)
    {
       delay = iptattrib[j].delay;
       if(fix_win_flag)
```

```
      {
         numpts = fix_win_len + 1;
         stsamp = (int) (iptattrib[j].time_top_pay + 0.5) - delay
            + skew_offset;
      }
      else
      {
         numpts = ((int) (iptattrib[j].time_base_pay + 0.5) -
            (int) (iptattrib[j].time_top_pay + 0.5)) + 2*pad + 1;
         stsamp = (int) (iptattrib[j].time_top_pay + 0.5) - delay -
            pad + skew_offset;
      }
      modseg = calloc(numpts, sizeof(float));
      stbyte = iptattrib[j].start_byte + (stsamp * 4);
      get_seg_tr(modfile, stbyte, numpts, modseg);

/* Generate array of normalized correlation coefficients */
      /* corresponding to a few lags above and below aligned model */
      /* and seismic tops. */ crossout = calloc(nlags, sizeof(float));
      shortXC(&trcseg[stpoint], modseg, numpts, nlags, crossout);

/* Load results of this comparison into compare structure. */ comp[j].seis_cdp = seisattrib[i].cdp_num;
      comp[j].mod_cdp  = iptattrib[j].cdp_num;
      comp[j].zer_xcorr = crossout[(nlags-1)/2];
      max_and_lag(crossout, nlags, &comp[j].max_xcorr, &comp[j].max_lag);

/* Compute full cross-correlation of windowed trace and model */
      /* segments which resulted in best correlation coefficient above. */

/*    fullcross = calloc((2*numpts)-1, sizeof(float));
      correlate(&trcseg[stpoint + (nlags-1)/2 + comp[j].max_lag],
               numpts, modseg, numpts, fullcross);                  */

/* Determine relative lag and instantaneous phase at */
      /* peak of envelope of full cross-correlation. */

/*    quadrature = calloc((2*numpts)+HILBLN-2, sizeof(float));
      phs_and_lag(fullcross, (2*numpts)-1, hbtoper, HILBLN, quadrature,
               &comp[j].phs_max_env, &comp[j].lag_max_env);         */

/* Calculate "quality factor" consisting of correlation */
      /* coefficient downgraded by a factor based on the phase of */
      /* the cross-corr, an indicator of its "skewness". */

/*    qfact = (PHSBASE - (ABS(comp[j].phs_max_env))) / PHSBASE;
      if(qfact<0)
```

```
            qfact = 0;
        comp[j].quality = comp[j].max_xcorr * qfact;                        */ free(crossout);
  /*   free(fullcross);
        free(quadrature);       */ diffpoint = stpoint + comp[j].max_lag + ((nlags-1)/2);
        comp[j].difference = difference(&trcseg[diffpoint], modseg, numpts);
        comp[j].signbit = dual_sign_bit(&trcseg[diffpoint], modseg, numpts);

free(modseg);
    }
    fwrite(comp, sizeof(struct compare), numtrm, compfile);
    free(trcseg);
  }
/* free(hbtoper);           */
    fclose(modfile);
    fclose(seisfile);
    fclose(compfile);
}
```

SUBROUTINE E

```c
#include <stdio.h>
#include <io.h>
#include <malloc.h>
#include <string.h>
#include <stdlib.h>
#include <math.h>
#include "nui.h"

void conv(float *, int, float *, int, float *);
double sumsq(float *, int);

void IbmToIeee(float *ibm, float *ieee, int n)
/*
    This subroutine converts a 32 bit FP IBM number to a 32 bit IEEE
    FP number The exponent of the IBM represents power of 16 against 2 for the
    IEEE number and it is shifted one bit to the left. We also
    need to take care of the hidden bit of the IEEE format
*/
{
  register union {
    float f;
    long l;
    unsigned char c[4];
  } temp, temp1, temp2;
  unsigned char c;
  unsigned long swaptest = 1;
  register int i;

for (i=0; i<n; i++) {
    /* we do IBM to IEEE conversion */
    temp.f = ibm[i];
    if (* (char *) &swaptest) {
      /* byte swaping */
      c = temp.c[0];
      temp.c[0] = temp.c[3];
      temp.c[3] = c;
      c = temp.c[1];
      temp.c[1] = temp.c[2];
      temp.c[2] = c;
    }
    if ((temp.l & 0x00800000) == 0) { /* test for high bit of IBM fraction */
      temp2.l = temp.l & 0x7f000000;  /* turn off sign bit                 */
      temp1.l = temp.l & 0xff000000;  /* get exponent and sign             */
      ieee[i] = (temp.f - temp1.f) * temp2.f * 0.125;
    } else {
      temp2.l = temp.l & ~0x00800000; /* turn off high bit of IBM fraction */
      temp1.l = temp.l & 0x7f000000;  /* get exponent and sign             */
      ieee[i] = temp2.f * temp1.f * 0.125;
```

```
        }
     }
} int flipit(int input_value)
{
   union
     {
        int ival;
        char cval[2];
     } a, b;

a.ival = input_value;
   b.cval[0] = a.cval[1];
   b.cval[1] = a.cval[0];
   return(b.ival);
} long longflip(long input_value)
{
   union
     {
        long lval;
        char cval[4];
     } a, b;

a.lval = input_value;
   b.cval[0] = a.cval[3];
   b.cval[1] = a.cval[2];
   b.cval[2] = a.cval[1];
   b.cval[3] = a.cval[0];
   return(b.lval);
} int normXcorr(float *x, int zpx, int nx, float *y, int zpy, int ny, float *c)
{
   int i, j;
   float *ptrx, *ptry, *ptrc, *lasty, *lastc;
   double factor;

lasty = y + ny - 1;                          /* Set pointers.          */
   ptrx = x;

for(i=0; i<nx; i++, ptrx++)                  /* Calculate cross-corr   */
     {                                          /* values.                */
        ptry = lasty;
        for(j=0; j<ny; j++, ptry--)
           c[i+j] += (*ptrx) * (*ptry);
```

```
    }
    factor = sqrt(sumsq(x, nx) * sumsq(y, ny));    /* Calculate normali- */
                                                   /* zation factor.     */
    lastc = c + nx + ny - 2;
    for(ptrc=c; ptrc<=lastc; ptrc++)               /* Normalize cross-corr. */
        *ptrc /= factor;

return(ny + zpx - zpy - 1);                    /* Return zero-lag index. */
}
double sumsq(float *array, int num)
{
    double squares = 0;
    int i;

for(i=0; i<num; i++, array++)
        squares += (*array) * (*array);

return(squares);
} void max_and_lag(float *array, int numpts, float *max, int *lag)
{
    float *ptr, *last;
    int pos;

ptr = array;
    last = array + numpts;

*max = *ptr;
    pos = 0-((numpts-1)/2);
    *lag = pos;
    for(ptr++, pos++; ptr<last; ptr++, pos++)
        if(*ptr > *max)
        {
            *max = *ptr;
            *lag = pos;
        }
} void shortXC(float *x, float *y, int npts, int nlags, float *cout)
{
    double y_engy, *x_engy, *ptr_x_engy;
    float *factor, *ptr_x, *ptr_y, *ptr_c, *ptr_fac, *last_x, *last_fac;
    int i;

x_engy = calloc(nlags, sizeof(double));        /* Create arrays for trace */
    factor = calloc(nlags, sizeof(float));         /* segment energy and norm- */
                                                   /* alization factors.      */
```

```
    y_engy = sumsq(y, npts);              /* Calculate energy of model */
    *x_engy = sumsq(x, npts);             /* trace segment, first trace */
    *factor = (float) sqrt(*x_engy * y_engy);  /* segment; also first factor */ ptr_fac = factor + 1;                 /* Calculate remaining trace */
    ptr_x_engy = x_engy + 1;              /* energies and normaliztion */
    ptr_x = x;                            /* factors.                  */
    last_x = x + npts;
    last_fac = factor + nlags - 1;
    for(; ptr_fac<=last_fac; ptr_fac++, ptr_x_engy++, ptr_x++, last_x++)
    {
        *ptr_x_engy = (*(ptr_x_engy-1)) - (*ptr_x * *ptr_x) +
                                          (*last_x * *last_x);
        *ptr_fac = (float) sqrt((*ptr_x_engy) * y_engy);
    }
    free(x_engy);

ptr_c = cout;            /* Calculate correlation coefficients for nlags. */
    for(i=0, ptr_fac=factor; i<nlags; i++, ptr_c++, ptr_fac++)
    {
        ptr_x = x + i;
        ptr_y = y;
        last_x = x + i + npts - 1;
        for(; ptr_x<=last_x; ptr_x++, ptr_y++)
            *ptr_c += (*ptr_x) * (*ptr_y);
        *ptr_c /= *ptr_fac;
    }
    free(factor);
} float difference(float *seg1, float *seg2, int numpts)
/* Finds average absolute value difference between two equal-length arrays. */
{
    float *ptr1, *ptr2, *last, sum=0, diff=0;

ptr1 = seg1;
    ptr2 = seg2;
    last = ptr1 + numpts;

for(; ptr1<last; ptr1++, ptr2++)
    {
        diff = *ptr1 - *ptr2;
        if(diff<0)
            diff = 0 - diff;
        sum += diff;
    }
    sum /= numpts;
    return(sum);
}
```

```c
void conv(float *x, int nx, float *y, int ny, float *c)
{
    float *ptrx, *ptry, *ptrc, *lastc;
    int i, j;

/* Ensure that values in output array are zeros. */ ptrc = c;
    lastc = c + nx + ny - 1;
    for(; ptrc<lastc; ptrc++)
        *ptrc = 0;

ptrx = x;
    for(i=0; i<nx; i++, ptrx++)            /* Calculate  */
    {                                       /* values.    */
        ptry = y;
        for(j=0; j<ny; j++, ptry++)
            c[i+j] += (*ptrx) * (*ptry);
    }
} void hilbt_oper(float *oper, int npts)
{
    int i, npts1;
    float rc, pi, *ptr1, *ptr2;

pi = 4 * (float) atan(1.0);
    rc = 2 / pi;
    npts1 = (npts - 1) / 2;
    ptr1 = oper + npts1 + 1;
    ptr2 = ptr1 - 2;

for(i=1; i<=npts1; i+=2, ptr1+=2, ptr2-=2)
    {
        *ptr1 = rc / i;
        *ptr2 = -(*ptr1);
    }
} void phs_and_lag(float *real, int nreal, float *hbtoper, int noper,
                 float *quad, float *phase, int *lag)
{
    float *ptr_real, *ptr_quad, *last, peak_env, envelope, convrt_deg;
    int pos;

/* Convolve with Hilbert transform operator to make quadrature trace. */ conv(real, nreal, hbtoper, noper, quad);

/* Set pointers, then calculate envelope and inst. phase at first sample. */
```

```
    ptr_real = real;
    ptr_quad = quad + ((noper - 1) / 2);
    last = real + nreal;
    convrt_deg = 180 / (4 * (float) atan(1.0));

peak_env = (float) sqrt((*ptr_real * *ptr_real) + (*ptr_quad * *ptr_quad));
    *phase =   ((float) atan2(*ptr_quad, *ptr_real)) * convrt_deg;
    pos = 0 - ((nreal - 1) / 2);
    *lag = pos;

/* Search for peak of envelope, calculate phase at that point. */ for(ptr_real++,ptr_quad++,pos++; ptr_real<last; ptr_real++,ptr_quad++,pos++)
    {
        envelope = (float) sqrt((*ptr_real * *ptr_real) + (*ptr_quad *
                    *ptr_quad));
        if(envelope > peak_env)
        {
            peak_env = envelope;
            *lag = pos;
            *phase = ((float) atan2(*ptr_quad, *ptr_real)) * convrt_deg;
        }
    }
} void correlate(float *x, int nx, float *y, int ny, float *c)
{
    int i, j;
    float *ptrx, *ptry, *ptrc, *lasty, *lastc;

lasty = y + ny - 1;                     /* Set pointers.           */
    ptrx = x;

for(i=0; i<nx; i++, ptrx++)             /* Calculate cross-corr    */
    {                                       /* values.                 */
        ptry = lasty;
        for(j=0; j<ny; j++, ptry--)
            c[i+j] += (*ptrx) * (*ptry);
    }
} float dual_sign_bit(float *seg1, float *seg2, int numpts)
{
    float *ptr1, *ptr2, *last, seg1slope, seg2slope;
    float disagree = 0;

ptr1 = seg1 + 1;
    ptr2 = seg2 + 1;
    last = seg1 + numpts;
```

```
    for(; ptr1<last; ptr1++, ptr2++)
    {
       if(((*ptr1<0) && (*ptr2>0)) || ((*ptr1>0) && (*ptr2<0)))
          disagree++;
       seg1slope = *ptr1 - *(ptr1 - 1);
       seg2slope = *ptr2 - *(ptr2 - 1);
       if(((seg1slope<0) && (seg2slope>0)) || ((seg1slope>0) && (seg2slope<0)))
          disagree++;
    }
    return(disagree);
}
```

SUBROUTINE F

```c
#include "nui.h"

void qksort_asc(struct compare **, int, int);    /* Ascending quicksort. */
void qksort_desc(struct compare **, int, int);   /* Descending quicksort. */ void nuisort(struct compare **pointers, int numpts)
{
            /*   Sort elements:
                 2 = xcorr coeff at zero lag
                 3 = maximum xcorr coeff
                 4 = average difference per sample
                 5 = phase at max envelope of best x-corr
                 6 = quality factor
                 7 = # dual sign bit differences          */ qksort_desc(pointers, numpts, 3);
 /* qksort_asc(pointers, 15, 4);        */
} void qksort_desc(struct compare **ptrs, int num, int offset)
{                                  /* Sort with a "quicksort" algorithm. */
   struct compare **l, **r, ***p, **i, **j, *temp, **stack[50];
   float v;

l = ptrs;                       /* Initialize pointers to whole array. */
   r = ptrs + num - 1;
   p = stack + 2;

while(p >= stack + 2)           /* If there are partitions to do, and  */
   {
      if(r > l)                    /* if the partition is not zero-length, */
      {
         v = *((float *)(*r)+offset);   /* Use last value in partition */
                                        /*   as "seed". */
         i = l;                     /* Set left pointer. */
         j = r;                     /* Set right pointer. */ do
         {
            while(i < j && *((float *)(*i)+offset) >= v)
               i++;                 /* Increment pointers from left */
            while(j > i && *((float *)(*j)+offset) <= v)
               j--;                 /* and right. */
            if(i < j)
            {
               temp = *i;                   /* Swap out-of-order elements. */
               *i = *j;
               *j = temp;
            }
         } while(i < j);
```

```c
            temp = *i;                  /* Put seed element in proper location */
            *i = *r;                    /* in the array, separating two */
            *r = temp;                  /* partitions. */ if((i - 1) > (r - i))       /* Determine which partition is larger. */
            {
                *p = l;                 /*                                      */
                *(p+1) = i - 1;         /*                                      */
                l = i + 1;              /* Store starting and ending locations  */
            }                           /* of larger partition on stack and     */
            else                        /* reset left or right pointer to       */
            {                           /* proceed with shorter partition.      */
                *p = i + 1;             /*                                      */
                *(p+1) = r;             /*                                      */
                r = i - 1;              /*                                      */
            }
            p += 2;                     /* Increment stack pointer. */
        }
        else
        {
            p -= 2;                     /* If done with short partition,        */
            l = *p;                     /* retrieve earlier partition limits    */
            r = *(p+1);                 /* from stack for processing.           */
        }
    }
} void qksort_asc(struct compare **ptrs, int num, int offset)
{                                       /* Sort with a "quicksort" algorithm. */
    struct compare **l, **r, ***p, **i, **j, *temp, **stack[50];
    float v;

l = ptrs;                           /* Initialize pointers to whole array. */
    r = ptrs + num - 1;
    p = stack + 2;

while(p >= stack + 2)               /* If there are partitions to do, and   */
    {
        if(r > l)                       /* if the partition is not zero-length, */
        {
            v = *((float *)(*r)+offset);   /* Use last value in partition */
                                           /*    as "seed". */
            i = l;                      /* Set left pointer. */
            j = r;                      /* Set right pointer. */ do
            {
                while(i < j && *((float *)(*i)+offset) <= v)
                    i++;                    /* Increment pointers from left */
```

```
            while(j > i && *((float *)(*j)+offset) >= v)
                j--;                        /* and right. */
            if(i < j)
            {
                temp = *i;                  /* Swap out-of-order elements. */
                *i = *j;
                *j = temp;
            }
        } while(i < j);

temp = *i;                  /* Put seed element in proper location */
        *i = *r;                    /* in the array, separating two */
        *r = temp;                  /* partitions. */ if((i - 1) > (r - i))       /* Determine which partition is larger. */
        {
            *p = l;                 /*                                      */
            *(p+1) = i - 1;         /*                                      */
            l = i + 1;              /* Store starting and ending locations  */
        }                           /* of larger partition on stack and     */
        else                        /* reset left or right pointer to       */
        {                           /* proceed with shorter partition.      */
            *p = i + 1;             /*                                      */
            *(p+1) = r;             /*                                      */
            r = i - 1;              /*                                      */
        }
        p += 2;                     /* Increment stack pointer. */
    }
    else
    {
        p -= 2;                     /* If done with short partition,        */
        l = *p;                     /* retrieve earlier partition limits    */
        r = *(p+1);                 /* from stack for processing.           */
    }
  }
}
```

```
/* Get attribute data for display on graph. */
  fseek(binfile, fileoffset, SEEK_SET);
  for(i=startindex, k=0; i<endindex; i++, k++) /* For each seis trace...*/
  {
      if(seisattrib[i].error_flag == 1)
      {
          fread(comp, sizeof(struct compare), numtrm, binfile);
          continue;                    /* If top missing, skip all diplay. */
      }

/* Load "compare statistics for this trace and sort. */ for(j=0; j<numtrm; j++)            /* build array of pointers.... */
          comp_ptrs[j] = comp + j;

fread(comp, sizeof(struct compare), numtrm, binfile);

nuisort(comp_ptrs, numtrm);

/* Draw worst 5 points in green. */ hpos = groffset + (PIXPERTRACE * k);
      _setcolor(10);
      for(j=5; j<10; j++)
      {
          _setvieworg(PAYORG);
          attrib = iptattrib[comp_ptrs[j]->mod_cdp].net_pay - minntpay;
          vpos = 0 - (int) (attrib * pixperpayunit);
          _rectangle(_GBORDER, hpos, vpos-1, hpos+1, vpos);
          _setvieworg(POREORG);
          attrib = iptattrib[comp_ptrs[j]->mod_cdp].net_por_ft - minntpore;
          vpos = 0 - (int) (attrib * pixperporeunit);
          _rectangle(_GBORDER, hpos, vpos-1, hpos+1, vpos);
          _setvieworg(HCPOREORG);
          attrib = iptattrib[comp_ptrs[j]->mod_cdp].hc_por_vol - minhcvol;
          vpos = 0 - (int) (attrib * pixperhcporeunit);
          _rectangle(_GBORDER, hpos, vpos-1, hpos+1, vpos);
      }

/* Draw next four better points in yellow. */

_setcolor(14);
      for(j=1; j<5; j++)
      {
          _setvieworg(PAYORG);
          attrib = iptattrib[comp_ptrs[j]->mod_cdp].net_pay - minntpay;
          vpos = 0 - (int) (attrib * pixperpayunit);
          _rectangle(_GBORDER, hpos, vpos-1, hpos+1, vpos);
```

```c
            _setvieworg(POREORG);
            attrib = iptattrib[comp_ptrs[j]->mod_cdp].net_por_ft - minntpore;
            vpos = 0 - (int) (attrib * pixperporeunit);
            _rectangle(_GBORDER, hpos, vpos-1, hpos+1, vpos);
            _setvieworg(HCPOREORG);
            attrib = iptattrib[comp_ptrs[j]->mod_cdp].hc_por_vol - minhcvol;
            vpos = 0 - (int) (attrib * pixperhcporeunit);
            _rectangle(_GBORDER, hpos, vpos-1, hpos+1, vpos);
        }

/* Draw best point in pink. */

_setcolor(12);
        _setvieworg(PAYORG);
        attrib = iptattrib[comp_ptrs[0]->mod_cdp].net_pay - minntpay;
        vpos = 0 - (int) (attrib * pixperpayunit);
        _rectangle(_GBORDER, hpos, vpos-1, hpos+1, vpos);
        _setvieworg(POREORG);
        attrib = iptattrib[comp_ptrs[0]->mod_cdp].net_por_ft - minntpore;
        vpos = 0 - (int) (attrib * pixperporeunit);
        _rectangle(_GBORDER, hpos, vpos-1, hpos+1, vpos);
        _setvieworg(HCPOREORG);
        attrib = iptattrib[comp_ptrs[0]->mod_cdp].hc_por_vol - minhcvol;
        vpos = 0 - (int) (attrib * pixperhcporeunit);
        _rectangle(_GBORDER, hpos, vpos-1, hpos+1, vpos);

/* Plot averaged profiles through attributes. */ avg_pay    = (3 * iptattrib[comp_ptrs[0]->mod_cdp].net_pay +
                      2 * iptattrib[comp_ptrs[1]->mod_cdp].net_pay +
                      2 * iptattrib[comp_ptrs[2]->mod_cdp].net_pay +
                      2 * iptattrib[comp_ptrs[3]->mod_cdp].net_pay +
                          iptattrib[comp_ptrs[4]->mod_cdp].net_pay +
                          iptattrib[comp_ptrs[5]->mod_cdp].net_pay +
                          iptattrib[comp_ptrs[6]->mod_cdp].net_pay) / 12;

avg_pore   = (3 * iptattrib[comp_ptrs[0]->mod_cdp].net_por_ft +
                      2 * iptattrib[comp_ptrs[1]->mod_cdp].net_por_ft +
                      2 * iptattrib[comp_ptrs[2]->mod_cdp].net_por_ft +
                      2 * iptattrib[comp_ptrs[3]->mod_cdp].net_por_ft +
                          iptattrib[comp_ptrs[4]->mod_cdp].net_por_ft +
                          iptattrib[comp_ptrs[5]->mod_cdp].net_por_ft +
                          iptattrib[comp_ptrs[6]->mod_cdp].net_por_ft) / 12;

avg_hcpore = (3 * iptattrib[comp_ptrs[0]->mod_cdp].hc_por_vol +
                      2 * iptattrib[comp_ptrs[1]->mod_cdp].hc_por_vol +
                      2 * iptattrib[comp_ptrs[2]->mod_cdp].hc_por_vol +
                      2 * iptattrib[comp_ptrs[3]->mod_cdp].hc_por_vol +
                          iptattrib[comp_ptrs[4]->mod_cdp].hc_por_vol +
                          iptattrib[comp_ptrs[5]->mod_cdp].hc_por_vol +
```

```
                        iptattrib[comp_ptrs[6]->mod_cdp].hc_por_vol) / 12;
    payvpos    = - (int) ((avg_pay   - minntpay)    * pixperpayunit);
    porevpos   = - (int) ((avg_pore  - minntpore)   * pixperporeunit);
    hcporevpos = - (int) ((avg_hcpore - minhcvol)   * pixperhcporeunit);
    _setcolor(12);
    If(i != startindex)
    {
        _setvieworg(PAYORG);
        _moveto(hpos - PIXPERTRACE, prevpayvpos);
        _lineto(hpos, payvpos);
        _setvieworg(POREORG);
        _moveto(hpos - PIXPERTRACE, prevporevpos);
        _lineto(hpos, porevpos);
        _setvieworg(HCPOREORG);
        _moveto(hpos - PIXPERTRACE, prevhcvpos);
        _lineto(hpos, hcporevpos);
    }
    prevpayvpos   = payvpos;
    prevporevpos  = porevpos;
    prevhcvpos    = hcporevpos;

}
```

That which is claimed is:

1. A method for determining petrophysical properties of a subterranean layer comprising the computer implemented steps of:

(1) providing at least one reference seismic trace corresponding to at least one reference lateral location and at least one nonreference seismic trace corresponding to at least one nonreference lateral location offset from said at least one reference lateral location, wherein each of the seismic traces results from the detection of the reflection of at least one seismic pulse as generated by at least one seismic source, and wherein each of the seismic traces includes a pair of reflection events respectively corresponding to the upper and lower boundaries of a subterranean layer of interest;

(2) providing a velocity log and a density log, which together comprise a reference log-pair, for the layer at said at least one reference lateral location so as to provide at least one reference-log pair having associated therewith at least one corresponding known value of at least one petrophysical property of the layer;

(3) determining at least one reference reflection coefficient based on said at least one corresponding reference log-pair;

(4) providing at least one, seismic wavelet which is representative of said at least one seismic pulse at the layer and which when convolved with said at least one reference reflection coefficient produces at least one reference synthetic seismogram which approximates said at least one reference seismic trace;

(5) deriving a set of a predetermined number of modified log-pairs, wherein each modified log-pair is different from one another and comprises a velocity log and a density log, each of which logs is a modified version of the respective velocity log and density log of said at least one reference log-pair, and wherein each of the modified log-pairs has associated therewith at least one value of said at least one petrophysical property of the layer which is different than said at least one known value of said at least one petrophysical property and wherein such modified log-pairs are representative of probable variations of said at least one petrophysical property for said at least one nonreference lateral location;

(6) determining a modified reflection coefficient based on the velocity log and density log of each of the modified log-pairs to thereby result in a number of modified reflection coefficients equivalent to the predetermined number of modified log-pairs;

(7) convolving each of the modified reflection coefficients with said at least one seismic wavelet to produce a modified synthetic seismogram for each of the modified reflection coefficients to thereby result in a number of modified synthetic seismograms equivalent to the predetermined number of modified log-pairs, each of the modified synthetic seismograms having reflect ton events corresponding to the upper and lower boundaries of the layer and also having associated therewith at least one value of said at least one petrophysical property associated with the corresponding modified log-pair;

(8) comparing a comparison window of said at least one nonreference seismic trace to a corresponding comparison window of each of the modified synthetic seismograms, where each comparison window includes the reflection events corresponding to the upper and lower boundaries of the layer;

(9) selecting those modified synthetic seismograms which match said at least one nonreference seismic trace sufficiently in step (8) to pass at least one predetermined matching threshold;

(10) assigning to said at least one nonreference seismic trace the values of said at least one petrophysical property corresponding to the respective modified synthetic seismograms selected in step (9), thereby providing a range of values of said at least one petrophysical property associated with said at least one nonreference seismic trace and said at least one corresponding nonreference lateral location of the layer.

2. A method as recited in claim 1 wherein said at least one petrophysical property is selected from the group consisting of layer thickness, porosity, lithelogical composition, water or hydrocarbon saturation, any derivative of one or more of the aforementioned properties, and combinations thereof.

3. A method as recited in claim 2 wherein the velocity log and the density log of said at least one reference log-pair are obtained by deriving such logs from a reference set of logs comprising a lithelogical composition log, a porosity log, and a water or hydrocarbon saturation log which corresponds to the reference lateral location, and wherein each of the modified log-pairs are derived from a modified set of logs of which at least one of such logs is a modified version of at east one of the logs of the reference set of logs.

4. A method as recited in claim 3 wherein the velocity and density logs of said at least one reference log-pair and the velocity and density logs of the modified log-pairs are each a series of values expressible as a curve or function of time or depth.

5. A method as recited in claim 4 wherein said at least one reference reflection coefficient and the modified reflection coefficients are each a series of values expressible as a curve or function of time or depth.

6. A method as recited in claim 5 wherein said at least one seismic wavelet is shaped such that said at least one reference synthetic seismogram, resulting from convolution of said at least one seismic wavelet with said at least one reference reflection coefficient, matches said at least one reference seismic trace sufficiently to pass at least one predetermined matching threshold.

7. A method as recited in claim 6 wherein in comparison step (8) the comparison employs crosscorrelation.

8. A method as recited in claim 6 wherein in comparison step (8) the comparison employs calculation of difference mismatch error.

9. A method as recited in claim 6 wherein in comparison step (8) the comparison employs a combination of crosscorrelation and difference mismatch error.

10. A method as recited in claim 6 wherein said at least one nonreference seismic trace comprises a plurality of nonreference seismic traces corresponding to a plurality of respective nonreference lateral locations.

* * * * *

UNITED STATES PATENT AND TRADEMARK OFFICE
CERTIFICATE OF CORRECTION

PATENT NO. : 5,487,001

DATED : January 23, 1996

INVENTOR(S) : Dennis B. Neff

It is certified that error appears in the above-indentified patent and that said Letters Patent is hereby corrected as shown below:

Column 88, line 32, delete "east" and insert ---least--- therefor.

Signed and Sealed this

Sixth Day of August, 1996

Attest:

BRUCE LEHMAN

*Attesting Officer*     *Commissioner of Patents and Trademarks*